United States Patent
Minami

(10) Patent No.: US 12,551,382 B2
(45) Date of Patent: Feb. 17, 2026

(54) DISPOSABLE WEARING ARTICLE

(71) Applicant: DAIO PAPER CORPORATION, Ehime (JP)

(72) Inventor: Takeshi Minami, Tochigi (JP)

(73) Assignee: Daio Paper Corporation, Ehime (JP)

( * ) Notice: Subject to any disclaimer, the term of this patent is extended or adjusted under 35 U.S.C. 154(b) by 120 days.

(21) Appl. No.: 18/551,735

(22) PCT Filed: Mar. 24, 2022

(86) PCT No.: PCT/JP2022/014100
§ 371 (c)(1),
(2) Date: Sep. 21, 2023

(87) PCT Pub. No.: WO2023/042457
PCT Pub. Date: Mar. 23, 2023

(65) Prior Publication Data
US 2024/0050289 A1    Feb. 15, 2024

(30) Foreign Application Priority Data
Sep. 17, 2021 (JP) .................. 2021-152491

(51) Int. Cl.
*A61F 13/496* (2006.01)
*A61F 13/49* (2006.01)

(52) U.S. Cl.
CPC ............ *A61F 13/4963* (2013.01); *A61F 2013/49087* (2013.01)

(58) Field of Classification Search
CPC ........ A61F 13/4963; A61F 2013/49087; A61F 13/49; A61F 13/496
See application file for complete search history.

(56) References Cited

U.S. PATENT DOCUMENTS 5,626,574 A * 5/1997 Sasaki ................... B29C 66/306
156/190
6,713,159 B1 3/2004 Blenke
(Continued)

FOREIGN PATENT DOCUMENTS

JP 07-034814 6/1995
JP 2002272785 A * 9/2002 ........... B29C 66/133
(Continued)

OTHER PUBLICATIONS

International Search Report for PCT/JP2022/014100, dated Apr. 26, 2022.
(Continued)

*Primary Examiner* — Susan S Su
(74) *Attorney, Agent, or Firm* — Andrus Intellectual Property Law, LLP

(57) ABSTRACT

A disposable wearing article that is easy to tear along the side seals with transverse ripping hardly occurring upon taking off the article. The disposable wearing article has side seals, each of which has a first line of first melt bonded areas and non-melt-bonded areas alternately arranged in the front-back direction, each of the first melt-bonded areas having a shape elongated in the front-back direction, the first line being positioned on the innermost side in the width direction of the side seal, and a second line of second melt-bonded areas arranged at intervals in the front-back direction, each of the second melt-bonded areas having a shape elongated in the front-back direction, the second line being positioned adjacent outward in the width direction of the first line with a non-melt-bonded zone intervening therebetween, the non-melt-bonded zone extending continuously in the front-back direction.

16 Claims, 15 Drawing Sheets

(56) References Cited

U.S. PATENT DOCUMENTS

| | | | | |
|---|---|---|---|---|
| 2003/0069554 A1* | 4/2003 | Malchow | ............... | D04H 1/559 |
| | | | | 604/385.01 |
| 2008/0140038 A1* | 6/2008 | Sasayama | ........... | A61F 13/4963 |
| | | | | 604/385.01 |
| 2009/0292266 A1* | 11/2009 | Back | ..................... | A61F 13/496 |
| | | | | 428/57 |
| 2019/0008703 A1* | 1/2019 | Saito | ..................... | A61F 13/565 |

FOREIGN PATENT DOCUMENTS

| | | |
|---|---|---|
| JP | 2010-115424 A | 5/2010 |
| JP | 2012110456 A | 6/2012 |
| JP | 2013106912 A | 6/2013 |
| JP | 2015-096192 | 5/2015 |
| JP | 2016-047307 | 4/2016 |
| JP | 2017-63943 | 4/2017 |
| JP | 2018-139718 | 9/2018 |
| JP | 2021-053231 | 4/2021 |
| WO | 2008069281 A1 | 6/2008 |

OTHER PUBLICATIONS

Extended European Search Report for EP Appl. No. 22869609.2, dated Aug. 1, 2025.

* cited by examiner

[FIG.1]
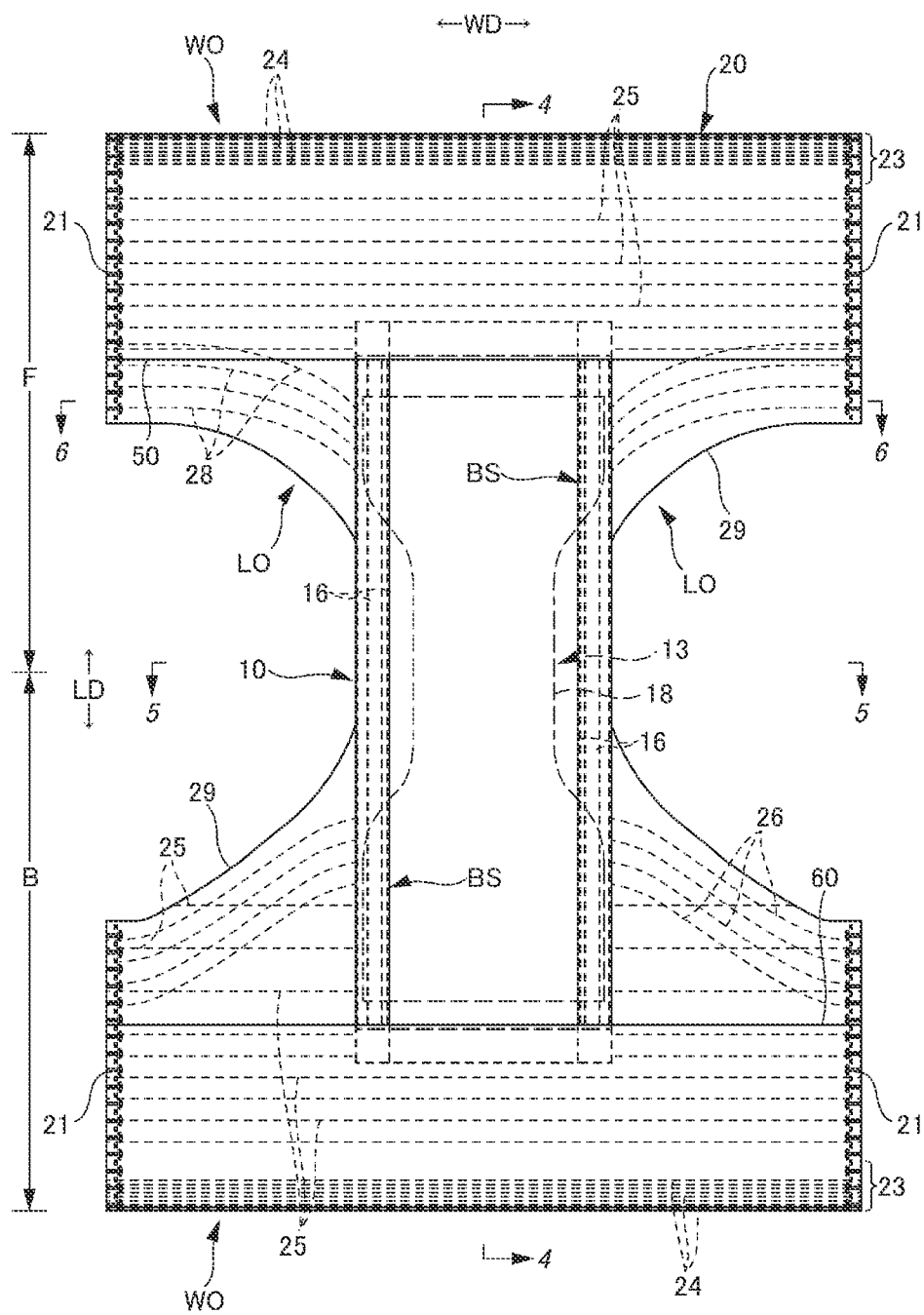

[FIG.2]
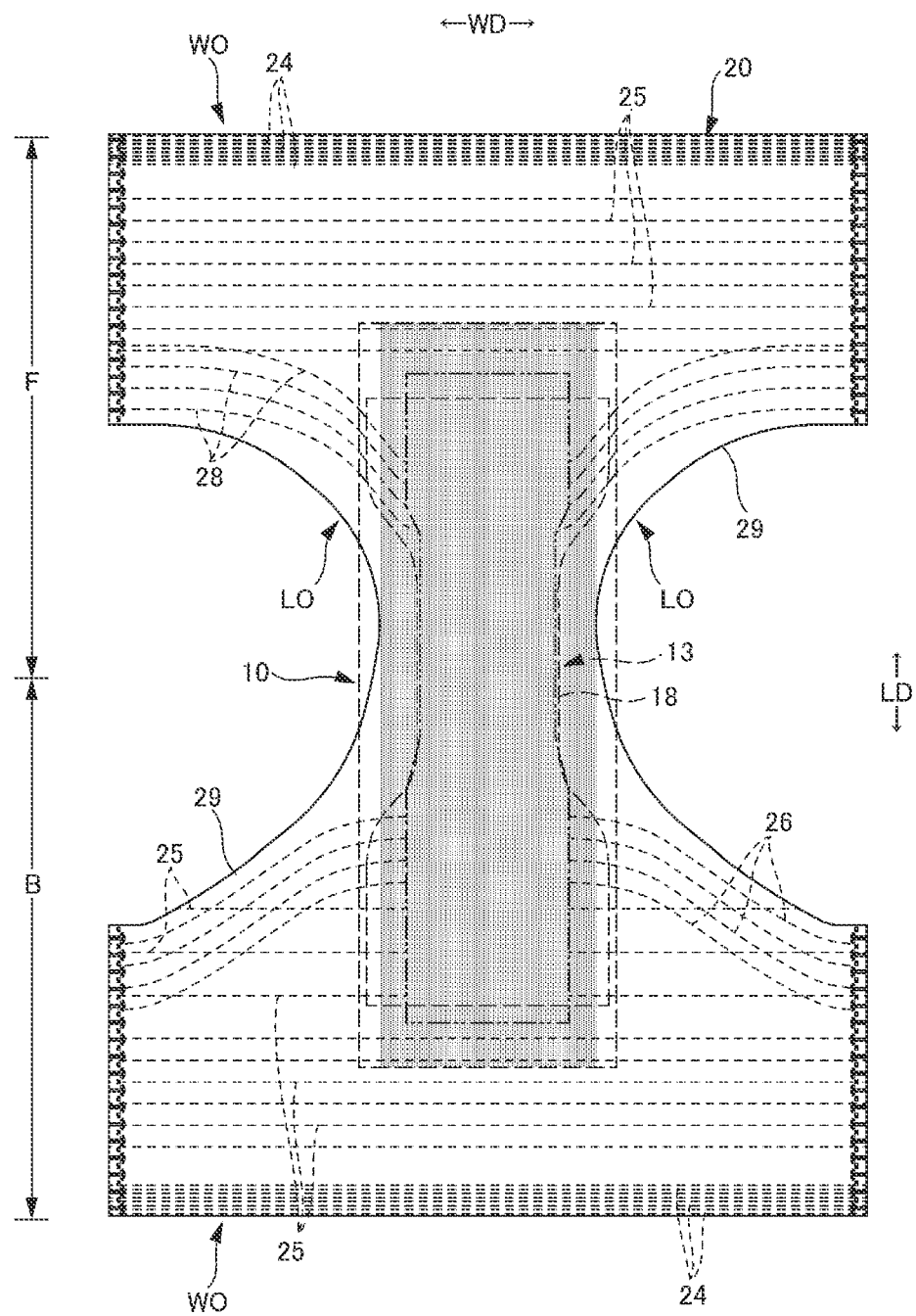

[FIG.3]
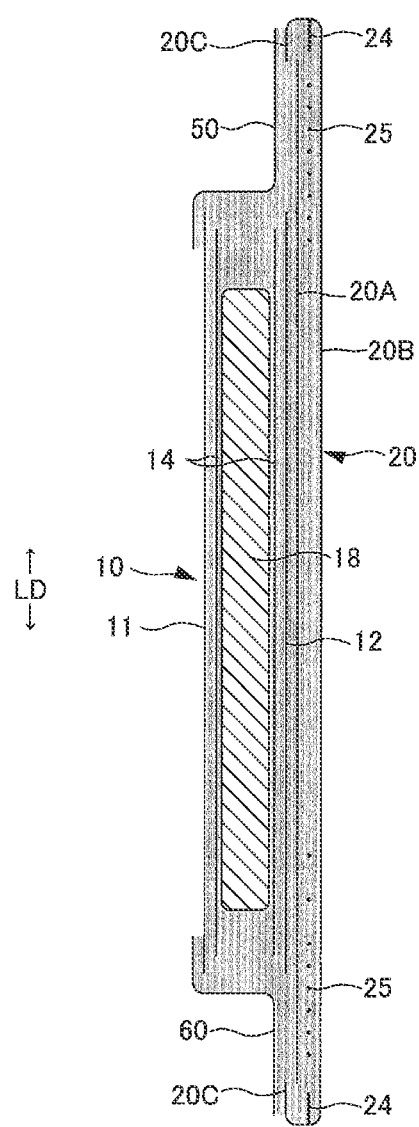

[FIG.4]
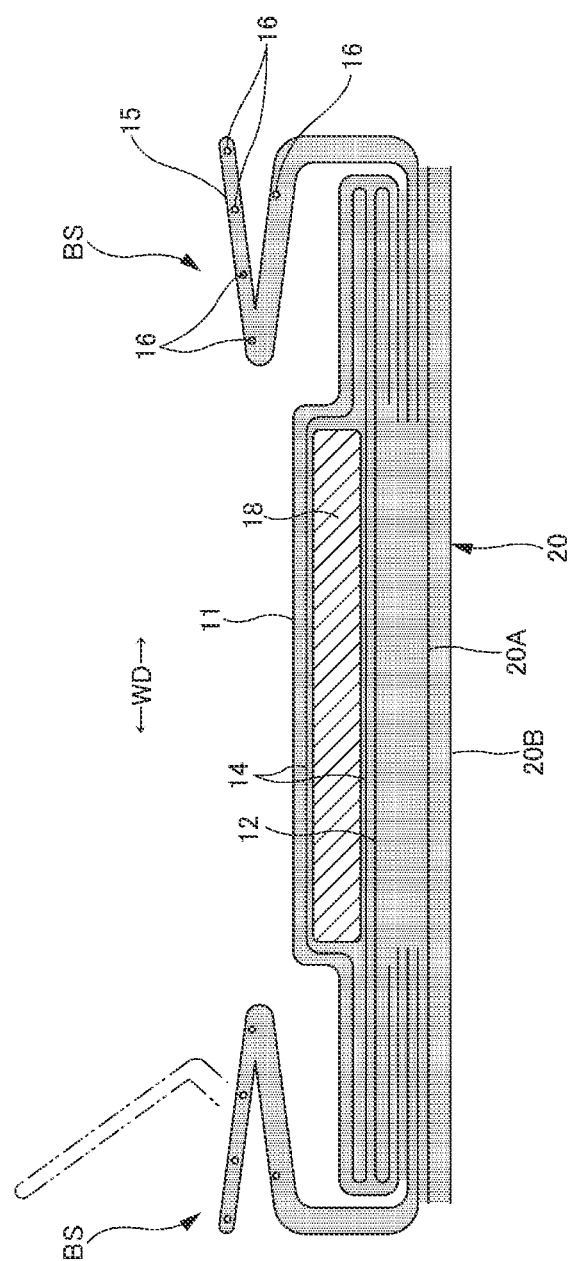

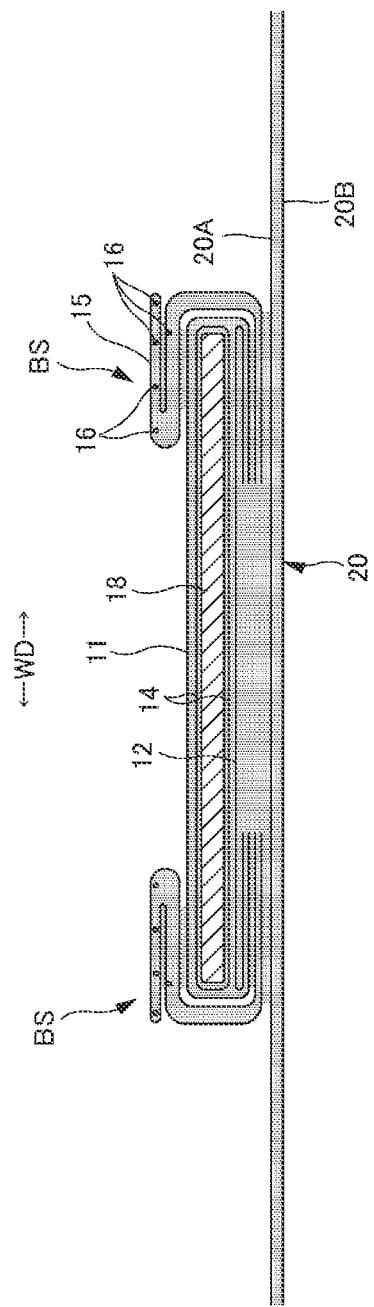
[FIG.5]

[FIG.6]
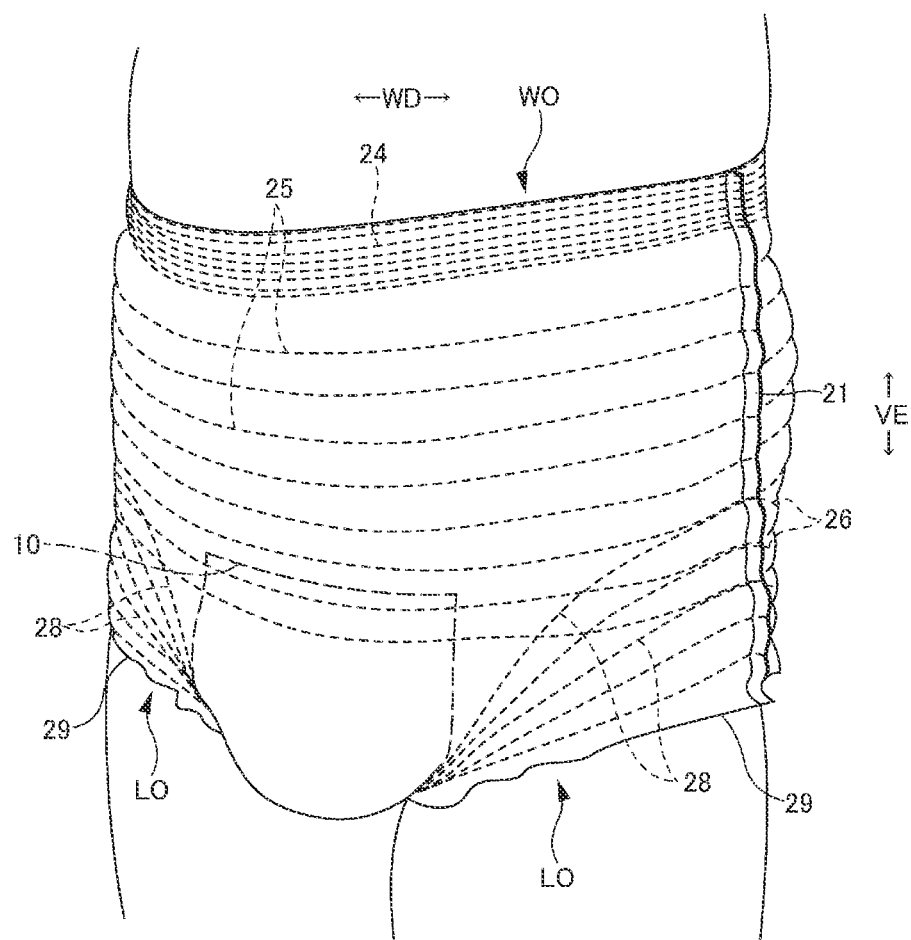

[FIG.7]
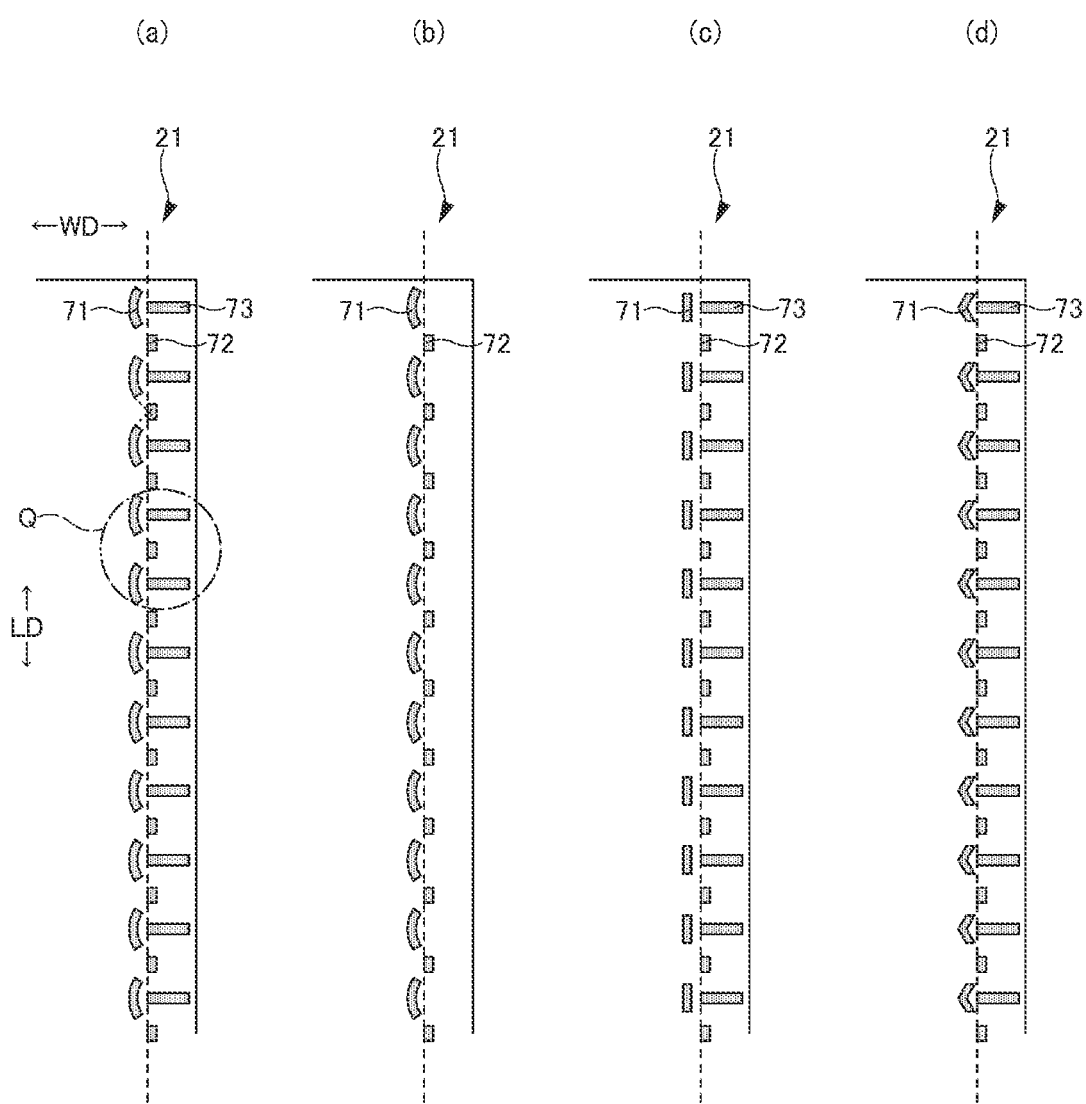

[FIG.8]
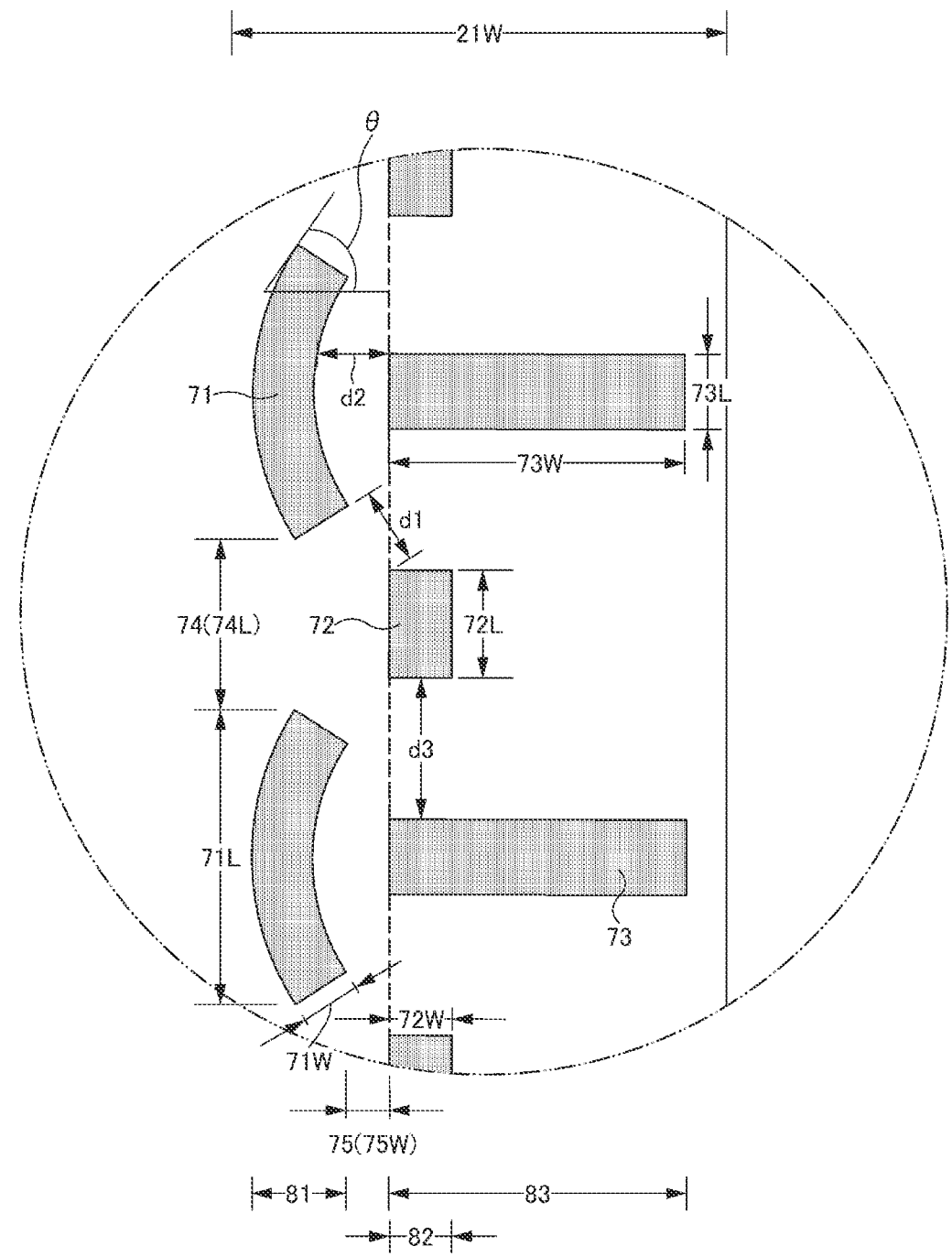

[FIG.9]
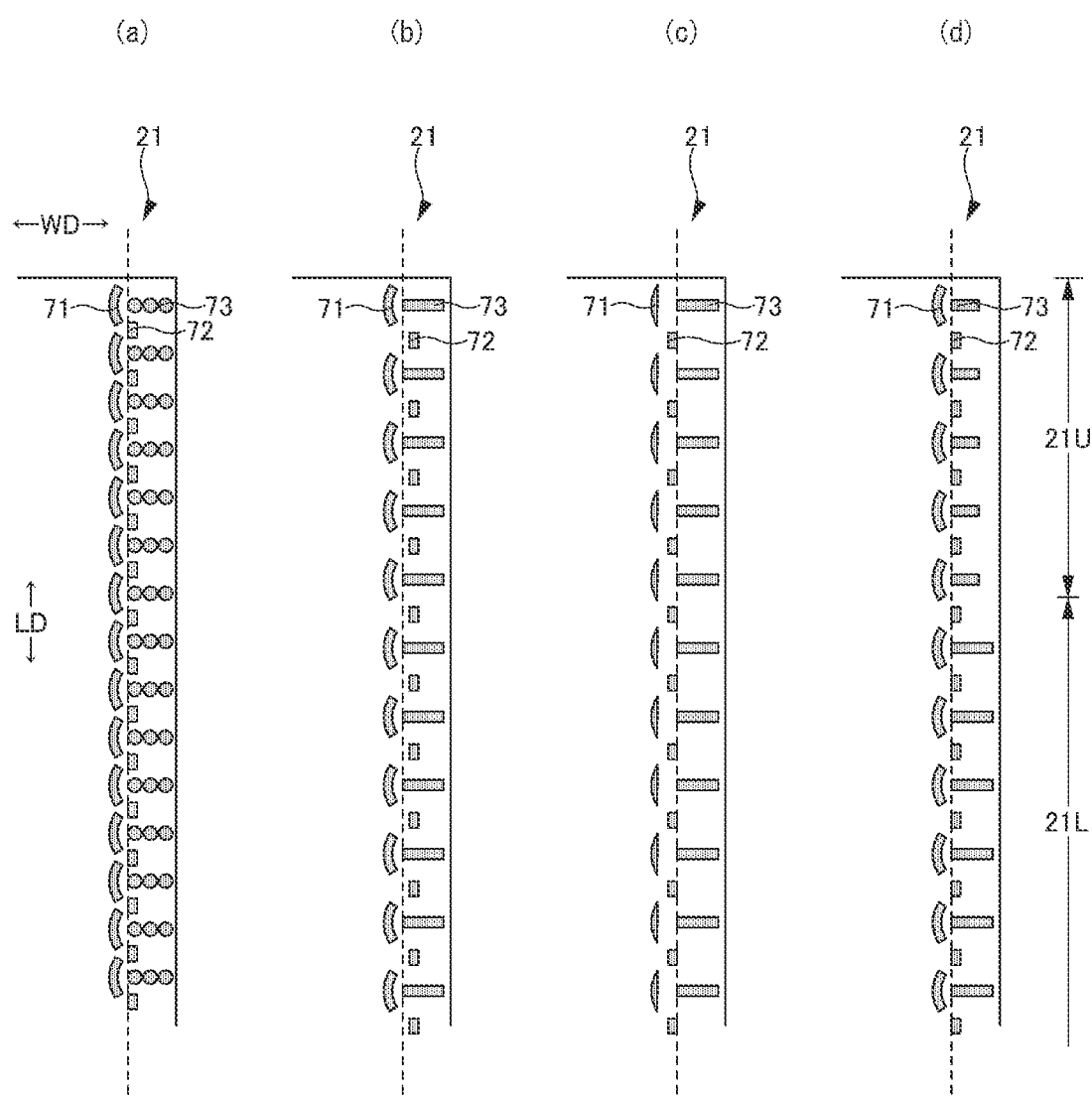

[FIG.10]
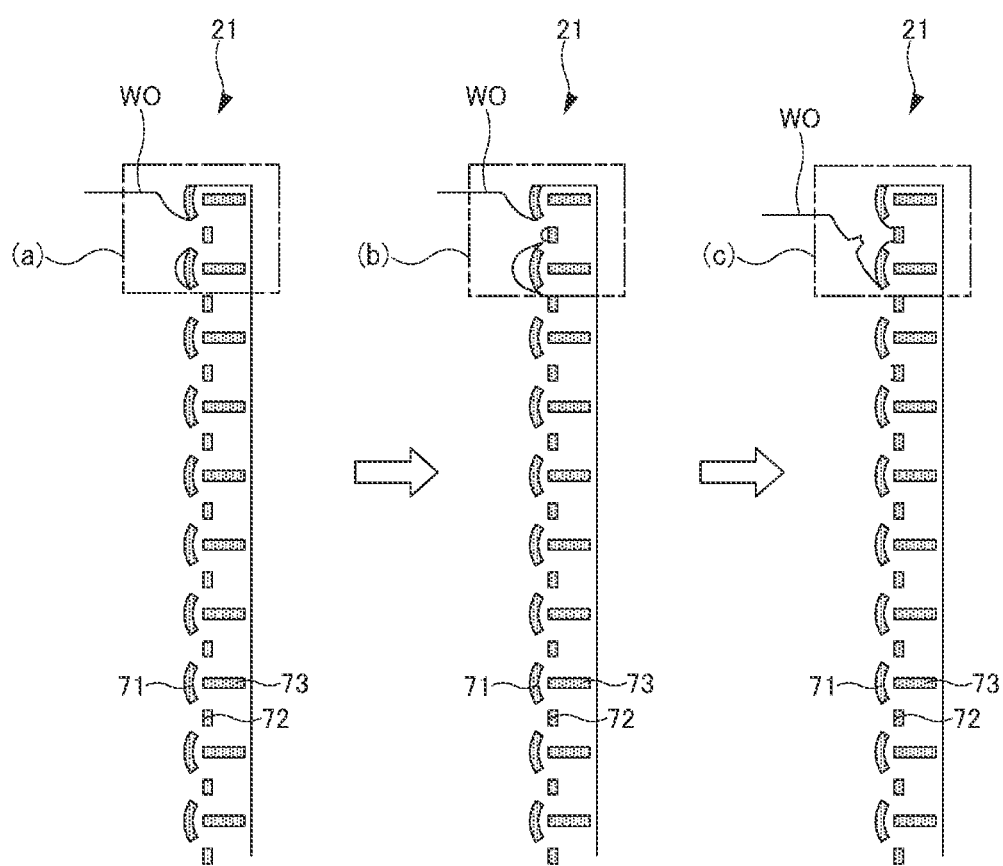

[FIG.11]
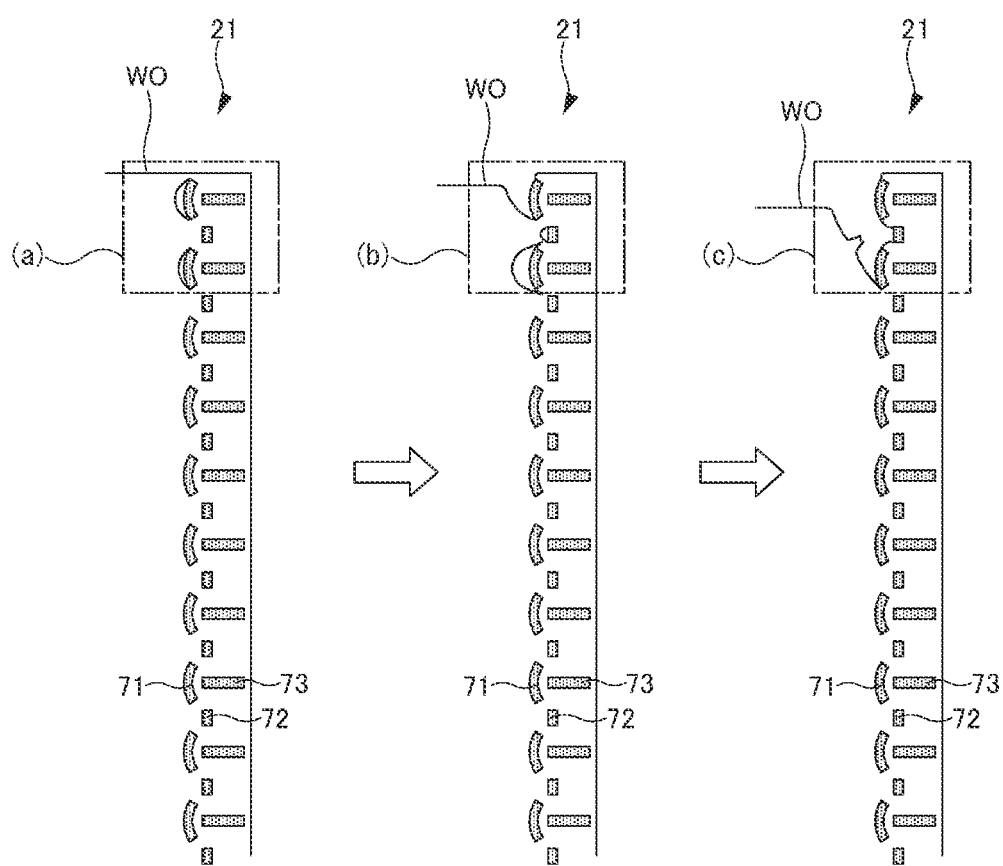

[FIG.12]
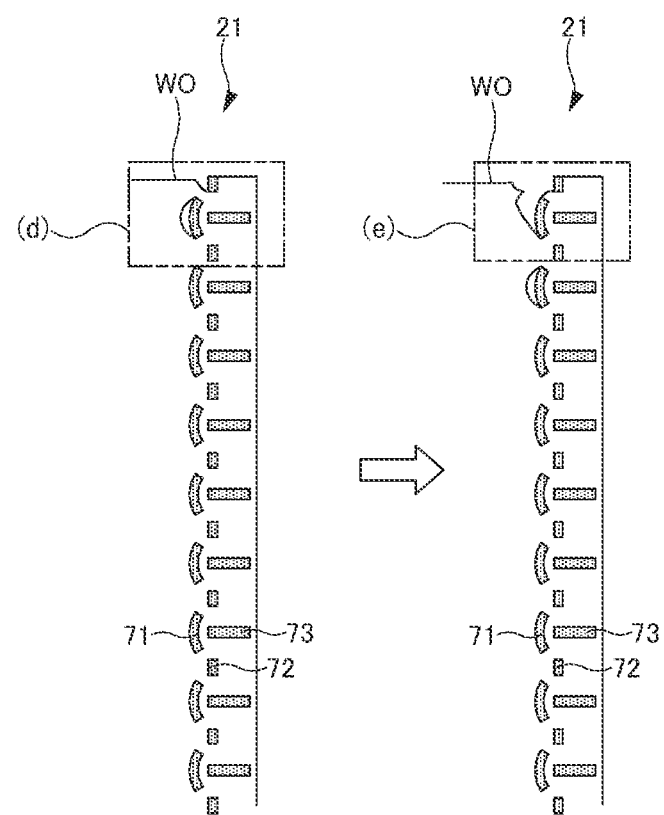

[FIG.13]
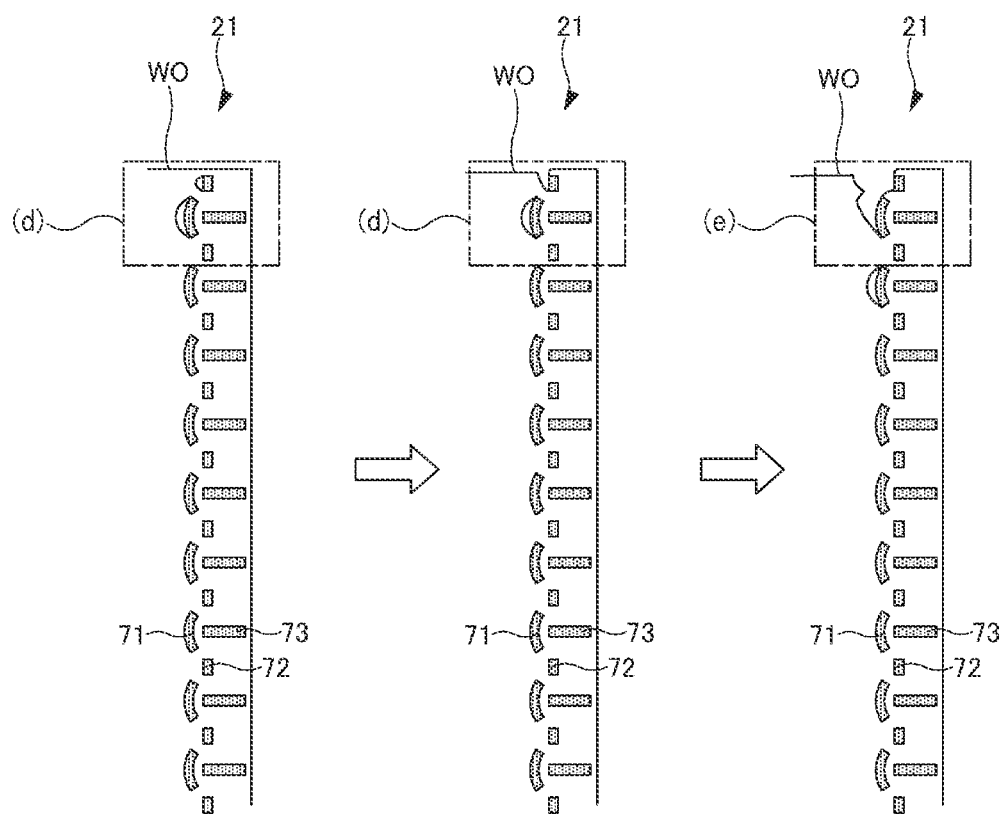

[FIG.14]
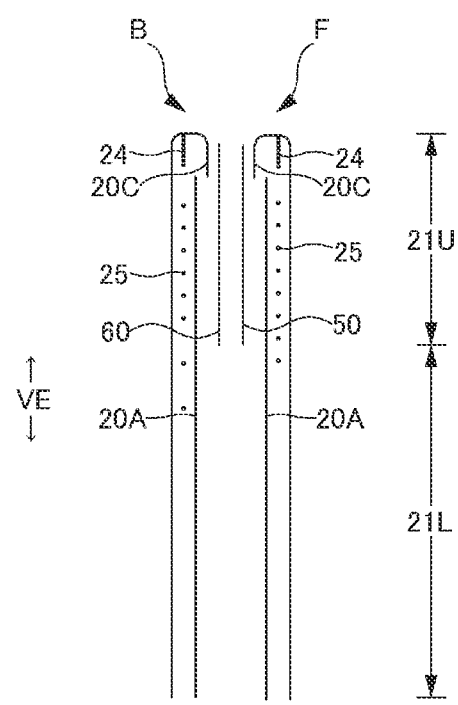

[FIG.15]
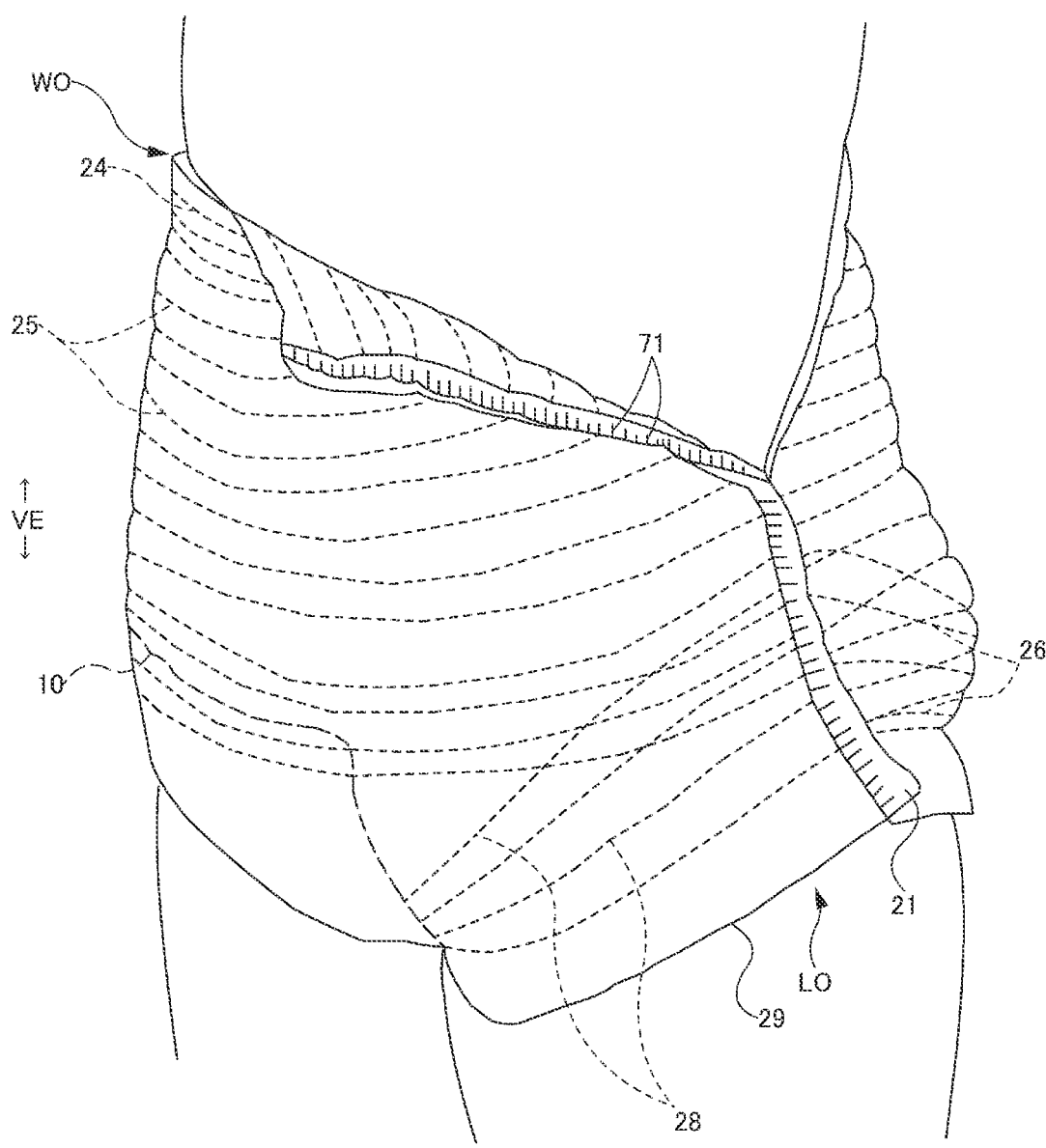

DISPOSABLE WEARING ARTICLE

CROSS-REFERENCE TO RELATED APPLICATIONS

This application is the U.S. national stage application of International Application PCT/JP2022/014100, filed Mar. 24, 2022, which international application was published on Mar. 23, 2023, as International Publication WO 2023/042457 in the Japanese language. The International Application claims priority of Japanese Patent Application No. 2021-152491, filed Sep. 17, 2021. The international application and Japanese application are both incorporated herein by reference, in entirety.

FIELD OF ART

The present invention relates to disposable wearing articles.

BACKGROUND ART

Underpants-type disposable diapers and trunks-type disposable wearing articles, such as disposable diapers, sanitary napkins, and diaper covers, have a front body and a back body joined together along their opposed lateral edge zones by melt-bonding to form opposed side seals. Each of the side seals has a number of melt-bonded areas arranged at intervals in a specific pattern. By forming the side seals, a flat article is transformed into an underpants- or trunks-like shape having a waist opening and leg openings.

With such a disposable wearing article, including a diaper, upon taking off a diaper after excretion or the like, the side seals are torn for removal of the diaper from the body. This action is done by the wearer himself or a caregiver when the products are for adults, whereas the action is usually done not by the wearer himself, but by parents when the products are for babies. For that reason, the side seals are required to have not only a sufficient joint strength for resisting tearing during wearing, but also tearability after use, for which improvement, various arrangements of the melt-bonded areas have been proposed (see Patent Publications 1 and 2). It has also been proposed to form perforated lines in the front body or the like adjacent to the side seals, from the edge of the waist opening down to the edge of the leg openings (see Patent Publication 3).

The manner of tearing the side seals of disposable wearing articles known generally includes pulling apart, by which the melt-bonding between the front and back body sections is subjected to interfacial peeling, and tearing off, by which one of the front and back body sections is split along the melt-bonded areas of the side seals. The former may be easy to improve the tearability after use, but difficult to secure the joint strength during wearing, whereas the latter may be easy to secure the joint strength during wearing, but difficult to improve the tearability after use.

In the tearing off, in particular, as the zones of the front and back body sections adjacent to the side seals have sufficient strength for keeping them from splitting during wearing, strong force is required for the tearing off. The tearing off also has a problem in that, in the course of the tearing, either of the front and back body sections is in principle prone to be ripped transversely toward the center in the width direction of the article (referred to as transverse ripping hereinbelow).

For example, Patent Publication 1 teaches to provide semicircular melt-bonded areas intermittently along the front-back direction of the side seals, each area having the arcuate outer edge and the straight inner edge extending in the front back direction. In the disposable diaper of Patent Publication 1, while splitting proceeds from one to the other of the melt-bonded areas adjacent to each other in the front-back direction, the transverse ripping tends to occur toward the center in the width direction of the article, which can never be stopped once occurred. This also occurs similarly in the disposable diaper of Patent Publication 2.

PRIOR ART PUBLICATION

Patent Publication

Patent Publication 1: JP 2015-96192 A
Patent Publication 2: JP 2021-53231 A
Patent Publication 3: JP 2018-139718 A

SUMMARY OF THE INVENTION

Problem to be Solved by the Invention

It is therefore a primary object of the present invention to provide a disposable wearing article which is easy to tear along the side seals and in which the transverse ripping hardly occurs.

Means for Solving the Problem

The disposable wearing articles which solve the problem are as follows:

First Aspect

A disposable wearing article including:
a front body section;
a back body section;
a waist opening;
a pair of leg openings; and
a pair of side seals formed by putting an interior face of the front body section and an interior face of the back body section together and melt-bonding the front and back body sections along opposed lateral edge zones thereof, each of the side seals having melt-bonded areas arranged at intervals in a specific pattern,
wherein each of the side seals has:
a first line of first melt-bonded areas and non-melt-bonded areas alternately arranged in a front-back direction, each of the first melt-bonded areas having a shape elongated in a front-back direction, the first line being positioned on an innermost side in a width direction of the side seal,
a second line of second melt-bonded areas arranged at intervals in the front-back direction, each of the second melt-bonded areas having a shape elongated in the front-back direction, the second line being positioned adjacent outward in the width direction of the first line with a non-melt-bonded zone intervening therebetween, the non-melt-bonded zone extending continuously in the front-back direction,
wherein the first melt-bonded areas and the second melt-bonded areas are disposed in a staggered arrangement so that the second melt-bonded areas are positioned outward in the width direction of the non-melt-bonded areas.

Function and Effect

According to the present disposable wearing article, for example, by the wearer or a non-wearer like a caregiver grasping the front body section with one hand in the vicinity of the waist opening, while grasping the back body section with the other hand in the vicinity of the waist opening, and applying force onto the article so as to separate the lateral edge zones of the front body section from the lateral edge zones of the back body section, the front body section or the back body section may be torn off along the melt-bonded areas of the side seals from the waist opening down to the leg openings. In place of grasping either the front and the back body sections, only the side seals may be grasped, or the side seals together with the front or back body section may be grasped. Alternatively, by changing the positions to be grasped with hands to the vicinity of the leg openings, the front body section or the back body section may be torn off from the leg openings up to the waist opening.

In such tearing, with the melt-bonded areas in the side seals being arranged according to the present aspect, the disposable wearing article may easily be torn along the side seals, while the transverse ripping is hard to occur, as will be discussed later.

Second Aspect

The disposable wearing article according to the first aspect,
wherein each of the first melt-bonded areas is shaped such that the first melt-bonded area has a middle part in the front-back direction located on an innermost side in the width direction of a side seal, and extends so as to be positioned outward in the width direction toward each end in the front-back direction.

Function and Effect

With the first melt-bonded areas in the shape according to this aspect, the tearing force on a first melt-bonded area is exerted predominantly on its middle part in the front-back direction, so that splitting is initiated primarily from the middle part in the front-back direction of the first melt-bonded area, and changes its direction obliquely toward a second melt-bonded area. Accordingly, the direction of splitting during the transition of the tearing from the first melt-bonded area to the second melt-bonded area tends to become stable, which causes the transverse ripping hard to occur.

Third Aspect

The disposable wearing article according to the second aspect,
wherein each of the first melt-bonded areas is in an arcuate shape, and
wherein a second melt-bonded area is located in a direction of a tangent line at each end of the first melt-bonded area.

Function and Effect

With each first melt-bonded area being in an arcuate shape according to this aspect, when the direction of splitting changes obliquely toward the second melt-bonded area, the change in direction of the force is smooth. Further, since the second melt-bonded area is located in the direction of the tangent line at each end of the first melt-bonded area, the direction of splitting of the non-melt-bonded zone during the transition from the split along the first melt-bonded area to the split along the second melt-bonded area tends to become stable, so that, even when the non-melt-bonded zone is stretched, the transverse ripping therefrom may be hard to occur.

Fourth Aspect

The disposable wearing article according to any one of the first to third aspects,
wherein each of the first melt-bonded areas is in an arcuate shape, and
wherein any tangent line to the first melt-bonded area forms an angle of 30 to 90 degrees with respect to the width direction.

Function and Effect

With each first melt-bonded area being in an arcuate shape according to this aspect, the split along the first melt-bonded area tends to proceed in the longitudinal direction, rather than the transverse direction, so that the tearing in the longitudinal direction is facilitated while the transverse ripping is avoided.

Fifth Aspect

The disposable wearing article according to any one of the first to fourth aspects,
wherein a dimension in the front-back direction of each first melt-bonded area is 0.5 to 2.0 mm,
wherein a dimension in the width direction of the first melt-bonded area is 0.1 to 0.8 times the dimension in the front-back direction of the first melt-bonded area,
wherein a minimum dimension in the front-back direction of each non-melt-bonded area is 1.0 to 2.5 mm,
wherein a dimension in the front back direction of each second melt-bonded area is 0.2 to 1.0 time the minimum dimension in the front-back direction of the non-melt-bonded area,
wherein a dimension in the width direction of the second melt-bonded area is 0.2 to 0.6 times the dimension in the front-back direction of the second melt-bonded area,
wherein a center in the front-back direction of the second melt-bonded area is positioned on a line passing a center in the front-back direction of the non-melt-bonded area and extending in the width direction, and
wherein a minimum dimension in the width direction of the non-melt-bonded zone is 0.1 to 0.6 times the minimum dimension in the front-back direction of the non-melt-bonded area.

Function and Effect

The dimensions and arrangement of each part may suitably be decided, and may usually be preferred to fall within the ranges according to the present aspect.

Sixth Aspect

The disposable wearing article according to any one of the first to fifth aspect,
wherein a third line of third melt-bonded areas arranged at intervals in the front-back direction is positioned adjacent outward in the width direction of the first line with the non-melt-bonded zone intervening therebetween, wherein the second melt-bonded areas and the third melt-bonded areas are spaced apart from each other, wherein an area of each third melt-bonded area is larger than an area of each first melt-bonded area and than an area of each second melt-bonded area, and wherein a minimum distance between a first melt-bonded area and a second melt-bonded area closest thereto is shorter than a minimum distance between the first melt-bonded area and a third melt-bonded area closest thereto and than a minimum distance between the second melt-bonded area and a third melt-bonded area closest thereto.

Function and Effect

In the side seals, defect in melt-bonding may occur wherein part of the melt-bonded areas are not melt-bonded, or are melt-bonded but are prone to be unbonded with weak force. Such melt-bonding defect is likely to occur when the melt-bonded area is smaller (the amount of the melt-bonding material is smaller) due to the elongate shape of the first melt-bonded areas and the second melt-bonded areas as discussed above, or the like factor. Accordingly, the melt-bonding defect is more likely to occur when the first melt-bonded areas and the second melt-bonded areas are particularly made thinner, aiming to make stable the direction of splitting along the first melt-bonded areas and of splitting along the second melt-bonded areas. In contrast, according to the present aspect, with the third melt-bonded areas being present, which have a larger area than that of the first melt-bonded areas and than that of the second melt-bonded areas (i.e., the melt-bonding defect is hard to occur), even when part of the first melt-bonded areas in the first line or part of the second melt-bonded areas in the second line are unbonded due to the melt-bonding defect, the continuity of the side seal may be supplemented with the third melt-bonded areas.

Further, mere provision of the third melt-bonding areas may cause split along a first melt-bonded area, which is to be directed to a second melt-bonded area, to be directed to a third melt-bonded area, impairing the readiness of tearing. However, according to the present aspect, the split along the first melt-bonded area is more likely to be guided to the second melt-bonded area, which is closer to the first melt-bonded area than the third melt-bonded area, and is less likely to be guided to the third melt-bonded area.

Seventh Aspect

The disposable wearing article according to the sixth aspect, wherein inner edges in the width direction of the second melt-bonded areas and inner edges in the width direction of the third melt-bonded areas are aligned on a straight line in the front-back direction, or wherein the inner edges in the width direction of the second melt-bonded areas are located outward in the width direction of the inner edges in the width direction of the third melt-bonded areas.

Function and Effect

The third line may be located outward in the width direction of the second line, and has advantages as will be discussed later, but may be added to the width of the side seals and thus increase the amount of the material to be used. However, with the layout of the second melt-bonded areas and the third melt-bonded areas according to this aspect, unnecessary broadening of the width of the side seals may be avoided.

Eighth Aspect

The disposable wearing article according to the sixth or seventh aspect, wherein outer edges in the width direction of the second melt-bonded areas are located inward in the width direction of the inner edges in the width direction of the third melt-bonded areas.

Function and Effect

According to this aspect, when a side seal is seen in the front-back direction, the first line, the second line, and the third line are positioned without overlapping, so that variation in area ratio of the melt-bonded areas (melt-bonded ratio) over each line is little and the melt-bonding is likely to be stable.

Ninth Aspect

The disposable wearing article according to any one of the sixth to eighth aspects, wherein the opposed lateral edge zones of the front body section and the opposed lateral edge zones of the back body section respectively have a plurality of stacked sheets, wherein each side seal has a plurality of regions containing different numbers of the stacked sheets, the regions being arranged in the front-back direction, and wherein dimensions in the width direction of the third melt-bonded areas are larger in a region where the number of the stacked sheets is smaller than in a region where the number of the stacked sheets is larger.

Function and Effect

In most of the disposable wearing articles having side seals, each side seal has a plurality of regions containing different numbers of stacked sheets, the regions being arranged in the front-back direction. Such a side seal to be torn as discussed above may be prone to melt-bonding defect when the dimensions in the width direction of all the third melt-bonded areas are the same. In contrast, when the dimensions in the width direction of the third melt-bonded areas are larger in the region where the number of stacked sheets is smaller than in the region where the number of stacked sheets is larger according to the present aspect, the melt-bonding defect may be hard to occur. This is because, in the region where the number of stacked sheets is smaller, the amount of resin involved in the melt-bonding is smaller, which tends to lower the strength of the melt-bonding. Without being limited to this manner, it is also conceivable to adjust the strength by, for example, arranging a plurality of the third melt-bonded areas at intervals in the width direction, with the number of the third melt-bonded areas arranged in the width direction being larger in the region where the number of stacked sheets is smaller than in the region where the number of stacked sheets is larger.

Effect of the Invention

According to the present invention, there is provided a disposable wearing article that is easy to tear off along the side seals but hard to be ripped transversely.

BRIEF DESCRIPTION OF THE DRAWINGS

FIG. 1 is a plan view (interior face) of an underpants-type disposable diaper in its spread state.

FIG. 2 is a plan view (exterior face) of the underpants-type disposable diaper in its spread state.

FIG. 3 is a perspective view of the underpants-type disposable diaper in a worn state.

FIG. 4 is a cross sectional view taken along lines 4-4 in FIG. 1.

FIG. 5 is a cross sectional view taken along lines 5-5 in FIG. 1.

FIG. 6 is a cross sectional view taken along lines 6-6 in FIG. 1.

FIG. 7 illustrates plan views of relevant parts of the side seals in the spread state.

FIG. 8 is an enlarged view of area Q in FIG. 7(*a*).

FIG. 9 illustrates plan views of relevant parts of the side seals in the spread state.

FIG. 10 illustrates, in plan views, tearing of a relevant part of the side seals in the spread state.

FIG. 11 illustrates, in plan views, tearing of a relevant part of the side seals in the spread state.

FIG. 12 illustrates, in plan views, tearing of a relevant part of the side seals in the spread state.

FIG. 13 illustrates, in plan views, tearing of a relevant part of the side seals in the spread state.

FIG. 14 is a sectional view of a side seal.

FIG. 15 is a perspective view of the underpants-type disposable diaper, with a side seal being torn.

MODES FOR CARRYING OUT THE INVENTION

An underpants-type disposable diaper as an example of disposable wearing articles will now be discussed in detail with reference to the attached drawings. Note that dotted pattern regions in the drawings represent an adhesive as joining means for joining various components located on top or bottom side thereof. The adhesive may be applied by, for example, solid, bead, curtain, summit, or spiral application, or pattern coating (transfer of a hot melt adhesive by relief printing) of a hot melt adhesive. In place of or in addition to the above, for fixed portions of elastic members, application of a hot melt adhesive to the external surface of the elastic members with a comb gun or a surewrap may be employed. Examples of the hot melt adhesive include, but not limited to, EVA-based, adherent rubber-based (elastomer-based), polyolefin-based, and polyester/polyamide-based adhesives. The joining means for joining components may alternatively be material melt-bonding, such as heat sealing or ultrasonic sealing.

As the nonwoven fabric in the description hereinbelow, commonly known nonwoven fabric may suitably be used depending on the parts or purposes. Examples of the constituent fibers of the nonwoven fabric include, but not limited to, synthetic fibers, such as polyolefin-based, e.g., polyethylene or polypropylene, polyester-based, or polyamide-based fibers (including not only single component fibers, but also composite fibers, such as of core/sheath type), as well as regenerated fibers, such as rayon or cupra, or natural fibers, such as cotton, and also mixtures thereof. For improved flexibility of the nonwoven fabric, the constituent fibers may preferably be crimped fibers. The constituent fibers of the nonwoven fabric may also be hydrophilic fibers (including those rendered hydrophilic with hydrophilizers), hydrophobic fibers, or water-repelling fibers (including those rendered water-repelling with water repellents). Further, nonwoven fabric may generally be categorized into discontinuous fiber nonwoven, continuous fiber nonwoven, spunbonded nonwoven, melt blown nonwoven, spunlace nonwoven, thermal bonded (air through) nonwoven, needle-punched nonwoven, point-bonded nonwoven, composite nonwoven (not only SSS nonwoven fabric having the identical or similar nonwoven fabric layers stacked one on another, but also SMS or SMMS nonwoven fabric having different nonwoven fabric stacked one on another, i.e., having one or more melt blown layers interposed between spunbonded layers), or the like nonwoven fabric, generally depending on the length of the fibers, method of forming the sheet, method of joining the fibers, or layered structure, and any of these nonwoven fabric may be used. Composite nonwoven fabric refers to those including all layers produced integrally and subjected to fiber-bonding processing all over the layers, and does not include those obtained by bonding a plurality of separately produced nonwoven fabric layers together with joining means, such as a hot melt adhesive.

Referring to FIGS. 1 to 6, an underpants-type disposable diaper is shown. This underpants-type disposable diaper (referred to simply as the diaper hereinbelow) has an outer member 20 defining a front body section F and a back body section B, and an inner member 10 fixed on the interior face of the outer member 20 covering from the front body section F over to the back body section B, wherein the inner member 10 is composed of a liquid-pervious top sheet 11, a liquid-impervious sheet 12, and an absorber body 18 interposed therebetween. In production, the under face of the inner member 10 is fixed to the interior face (top face) of the outer member 20 with joining means, such as a hot melt adhesive (dotted pattern region in FIG. 2), then the inner member 10 and the outer member 20 together are folded along the transverse line passing the center in the front-back direction (longitudinal direction) forming the border between the front body section F and the back body section B, and the front and back body sections are joined together along the opposed lateral edge zones by means of thermal melt-bonding, ultrasonic melt-bonding, or the like, to form opposed side seals 21, resulting in an underpants-type disposable diaper having a waist opening WO and a pair of right and left leg openings LO defined therein.

Example of Inner Member Structure

The inner member 10 has a structure including, as shown in FIGS. 3 to 5, a top sheet 11, a liquid-impervious sheet 12, and an absorber body 18 interposed therebetween, and absorbs and contains excreted liquid permeated through the top sheet 11 in the absorber body 18. The plan shape of the inner member 10 is not particularly limited, and is usually a generally rectangular shape as in the illustrated embodiment.

Absorber Body

The absorber body 18 may have a single-layered structure or a multi-layered structure. The absorber body 18 contains superabsorbent polymer particles, and may preferably be a mixed accumulation of pulp fibers and superabsorbent polymer particles. The absorber body 18 may be packaged with a liquid-pervious, liquid-retaining packing sheet 14, such as of crepe paper, for retaining its shape and holding the polymer therein.

The superabsorbent polymer particles may be those used in this type of absorbent articles as they are, and may preferably be particles 30 wt % or less of which remain on a 500 μm standard sieve (JIS Z8801-1: 2006) after sieving (five-minute shaking), and particles 60 wt % or more of which remain on a 180 μm standard sieve (JIS Z8801-1: 2006) after sieving (five-minute shaking).

Any material of the superabsorbent polymer particles may be used without particular limitation, and those having a water absorption rate of 35 to 60 seconds and a water absorption of 50 to 70 g/g are preferred. The superabsorbent polymer particles may be formed of starch-based, cellulose-based, or synthetic polymer-based. Starch-acrylic acid (salt) graft copolymers, saponified products of starch-acrylonitrile copolymers, cross-linked sodium carboxymethyl cellulose, or acrylic acid (salt) polymers may preferably be used. The basis weight of the superabsorbent polymer particles may suitably be decided depending on the absorption amount required in the product. Thus, it depends, but the basis weight may be 100 to 350 g/m$^2$.

The shape of the absorber body 18 may suitably be decided, and may be rectangular or preferably in a shape having a narrowed portion 13 in the crotch section, with a smaller width compared to the width of the portions forward and backward thereof. The size of the narrowed portion 13 may suitably be decided, and the width of the narrowest portion may be about 40 to 60% the overall width of the absorber body 18.

The top sheet 11 covering the top side (the side of the face to be in contact with the skin) of the absorber body 18 may preferably be perforated or non-perforated nonwoven fabric or porous plastic sheet. The nonwoven fabric is not particularly limited, and may preferably be discontinuous fiber nonwoven fabric wherein the fibers are joined together through hydro-entangling, hot-air bonding, or the like, where soft texture is valued. When the top sheet 11 is provided with a number of through holes, rapid absorption of urine or the like may be realized. In the illustrated embodiment, the top sheet 11 extends around the side edges of the absorber body 18 onto the underside thereof.

The liquid-impervious sheet 12 covering the underside (the side of the face out of contact with the skin) of the absorber body 18 may be a sheet of liquid-impervious plastic, such as polyethylene or polypropylene, and those having moisture-permeability are preferably used recently for preventing dampness. Such liquid-impervious, moisture-permeable sheet may preferably be a microporous sheet obtained by kneading an inorganic filler, such as of calcium carbonate, in a polyolefin-based resin, such as polyethylene or polypropylene, in a molten state, forming the resulting mixture into a sheet, and then uni- or biaxially drawing the sheet. In the illustrated embodiment, the liquid-impervious sheet 12, together with the top sheet 11, is folded back in the lateral portions opposed in the width direction of the absorber body 18 onto the underside, but is not limited to such a structure and may adopt any other known structure.

On each lateral portion of the inner member 10, a three-dimensional gather part BS which mainly fits on and around each leg is provided. Each three-dimensional gather part BS has, as shown in FIGS. 4 and 5, a fixed portion fixed on the under face of the inner member 10 in its lateral portion, a main body portion extending from the fixed portion around the lateral side of the inner member 10 onto the top face of the inner member 10 in its lateral portion, laid-down portions formed by fixing the front and back end portions, respectively, of the main body portion in a laid down state to the top face of the inner member 10 in its lateral portion, and a free portion formed by unfixing the zone between the laid-down portions of the main body portion. These portions are formed from a gathered sheet 15 which has been formed into a duplicate sheet by folding. Between the layers of the duplicate sheet, elongate gathering elastic members 16 are arranged in the free edge area or the like of the free portion. With such a structure of the three-dimensional gather parts BS, the free portions, which project in the opposed lateral portions of the absorber body, are raised in the product state, as shown in chain double-dashed line in FIG. 4, with the contraction of the gathering elastic members 16. The gathered sheet 15 may preferably be formed of nonwoven fabric which has been rendered water-repelling.

Each gathering elastic member 16 may be made of a material that is usually used, for example, polystyrene rubber, polyolefin rubber, polyurethane rubber, polyester rubber, polyurethane, polyethylene, polystyrene, styrene-butadiene, silicone, or polyester. The gathering elastic members, for making them hardly observable from outside, may preferably have a fineness of 925 dtex or less and are arranged at a tension of 150 to 350% and at intervals of 7.0 mm or less. In addition, the gathering elastic members 16 may be in the form of strings as in the illustrated embodiments, or in the form of tapes having a certain width.

The raw material fibers constituting the above-mentioned gather sheet 15 may also be selected from various materials, like the top sheet 11, and may preferably be nonwoven fabric, in particular, nonwoven fabric with a reduced basis weight for improved air-permeability for the purpose of preventing dampness. Further, the gathered sheet 15 may preferably be formed of a water-repelling nonwoven fabric with a coating of a silicone-, paraffin-metal-, or alkyl chromic chloride-based water repelling agent for preventing permeation of urine or the like as well as for preventing rash and improving a touch to the skin (dryness).

Example of Outer Member Structure

The outer member 20 may be of any known structure without particular limitation. The outer member 20 in the embodiment shown in FIGS. 3 to 5 has a two-layered structure composed of a presser sheet 20A and a backing sheet 20B. Elastic members 24 to 26, 28 are arranged between the presser sheet 20A and the backing sheet 20B as well as between the layers of the backing sheet 20B in a folded portion 20C formed by folding the backing sheet 20B onto the interior face along the edge of the waist opening WO. The outer member 20 is contracted under the contraction force of the elastic members in the natural length state, whereby stretchability is imparted to the outer member 20. The planar shape is generally an hourglass shape having centrally-curved round-leg lines 29 provided in the opposed lateral portions in the middle for forming leg openings LO. The presser sheet 20A in the illustrated embodiment may be omitted, and the folded portion 20C of the backing sheet 20B may be extended toward the crotch beyond the elastic member located closest to the crotch, to hold all the elastic members between the layers of the backing sheet in the folded portion 20C.

The sheet forming the outer member 20 may preferably be nonwoven fabric in view of air permeability or texture, but may be any sheet without particular limitation as long as melt-bonding along the side seals may be performed and, for example, in place of or in addition to the nonwoven fabric, other materials, such as a sheet of thermoplastic resin including an elastic film or the like, may be used. The nonwoven fabric, when used, may preferably be spunbonded nonwoven fabric generally having a fineness of 1 to 3 dtex and a basis weight of 10 to 25 g/m$^2$, and part or all of the layers of the sheet may be discontinuous fiber nonwoven fabric. Further, the sheet forming the outer member 20 may be ordinary nonwoven fabric which elastically contacts and expands little (less than 200% stretch rate in the width direction WD), or a sheet having certain stretchability (200% or more stretch rate in the width direction WD), such as stretchable nonwoven fabric composed of elastomer fibers, or an elastic film.

The outer member 20 in the illustrated embodiment is provided with elastic members, which are, in the spread state as shown in FIGS. 1 and 2, waist elastic members 24 located in the vicinity 23 of the waist opening, a plurality of under-waist elastic members 25 arranged at longitudinal intervals, each extending in the width direction, and a plurality of curved elastic members 26, 28 arranged at intervals without intersection, each extending in a curved manner from one of the opposed side seals 21 along one of the leg openings LO, across the crotch section, further along the other of the leg openings LO up to the other of the side seals 21, in each of the front body section F and the back body section B separately from a group of the under-waist elastic members 25. These elastic members 24 to 26, 28 are each fixed in a stretched state at a particular stretch rate along the respective direction of extension. Incidentally, in the present outer member 20, elastic members are not provided which extend from one of the side seals 21 in the front body section F along the corresponding round-leg line 29 up to the side seal 21 in the back body section B.

The waist elastic members 24 are in the form of a plurality of elongate elastic members, such as rubber threads, arranged at longitudinal intervals in the vicinity of the waist opening WO edge within the extension between the side seals 21 joining the front body section F and the back body section B, and produce stretching/contracting force to constrict the body in the waist zone for fitting the diaper on the body. The waist elastic members 24, which are rubber threads in the illustrated embodiment, may be, for example, a stretchable member in the form of a tape. Further, the waist elastic members 24, which are held between the layers of the doubled nonwoven fabric sheet in the folded portion 20C of the backing sheet 20B in the waist zone in the illustrated embodiment, may be held between the presser sheet 20A and the backing sheet 20B.

The under-waist elastic members 25 are in the form of elongate elastic members, such as rubber threads, arranged at longitudinal intervals within the front-back extension of the side seals 21, and impart stretching/contracting force in the width direction WD in the under-waist zones of the front body section F and the back body section B for bringing the diaper into close contact with the body. The waist elastic members 24 and the under-waist elastic members 25 may not necessarily be clearly divided along a boundary. For example, it suffices that, among the elastic members arranged at longitudinal intervals, each extending in the width direction WD, in the front body section F and in the back body section B, some elastic members from the upper side, though the number may not be specified, function as the waist elastic members 24, while the remaining elastic members function as the under-wait elastic members 25.

In the back body section B, dorsal curved elastic members 26 provided separately from the under-waist elastic members 25 are in the form of elongate elastic members, such as rubber threads, and arranged along predetermined curved lines. Only one dorsal curved elastic member 26 may be provided, but preferably a plurality of them is provided, and in the illustrated embodiment, four elongate elastic members, such as rubber threads, are provided, and these dorsal curved elastic members 26 are arranged at intervals without intersection. These dorsal curved elastic members 26 are not provided substantially as a bunch of about two or three elastic members arranged at close intervals, but three or more of them, preferably four or more of them are arranged at intervals of 3 to 20 mm, preferably about 6 to 16 mm, to form a predetermined stretchable/contractible zone.

In the front body section F of the outer member 20, ventral curved elastic members 28 provided separately from the under-waist elastic members 25 are in the form of elongate elastic members, such as rubber threads, and arranged along predetermined curved lines. Only one ventral curved elastic member 28 may be provided, but preferably a plurality of them is provided, and in the illustrated embodiment, four thread-like elastic members are provided, and these ventral curved elastic members 28 are arranged at intervals without intersection. These ventral curved elastic members 28 are not provided substantially as a bunch of about two to three elastic members arranged at close intervals, but three or more of them, preferably four or more of them are arranged at intervals of 3 to 20 mm, preferably about 6 to 16 mm, to form a predetermined stretchable/contractible zone.

Note that, as shown in FIG. 2, during manufacture, each of the under-waist elastic members 25 and the curved elastic members 26, 28 arranged in the front body section F and in the back body section B may be unintermittently fixed to the outer member 20, and then finely cut in a predetermined cutting pattern in the middle portion in the width direction of the area that overlaps the absorber body 18 (the area encircled by chain double-dashed lines in the figure) to provide a non-contractible area wherein the contraction force does not act, whereas the portions of the elastic members 25, 26, 28 extending laterally from the non-contractible area provide contractible areas wherein the contraction force acts (i.e., the portions of the under-waist elastic members 25 and the curved elastic members 26, 28 remaining unintermittently). This assists in avoiding unwanted contraction in the width direction WD of the inner member 10 (in particular, the absorber body 18). It is indisputable that the under-waist elastic members 25 and the curved elastic members 26, 28 may be disposed unintermittently across the inner member 10.

The outer member 20 discussed above may be manufactured using the technologies disclosed, for example, in JP H04-28363 A or JP H11-332913 A. The curved elastic members 26, 28 may be cut on the inner member 10 into an intermittent state preferably using the cutting method disclosed in JP 2002-035029 A, JP 2002-178428 A, or JP 2002-273808 A.

Unlike the illustrated embodiment, the curved elastic members 26, 28 may be provided in only either one of the front body section F and the back body section B. On the other hand, with the curved elastic members 26, 28 in both the front body section F and in the back body section B, an embodiment (not shown) may be also conceivable in which part or all of a group of curved elastic members 28 arranged on the front body section F side intersects with part or all of a group of curved elastic members 26 arranged on the back body section B side, but the embodiment as illustrated is preferred, in which the group of curved elastic members 28 arranged on the front body section F side and the group of curved elastic members 26 arranged on the back body section B side do not intersect with each other, and are arranged longitudinally spaced apart from each other in the middle in the front-back direction, in particular, in the area slightly closer to the front body section F.

The stretch rates of the elastic members 24 to 26, 28 in the fixed states may suitably be decided. For ordinary adult diapers, the stretch rate of the waist elastic members 24 may be about 160 to 320%, that of the under-waist elastic members 25 may be about 160 to 320%, and that of the curved elastic members 26, 28 may be about 230 to 320%.

In the illustrated embodiment, the outer member 20 is continuous over the front body section F and the back body section B, but may be formed separately for the front body section F and the back body section B and arranged spaced from each other via the crotch section in the front-back direction LD of the diaper.

Cover Sheet

As shown in FIGS. 1 and 3, cover sheets 50, 60 may be disposed for covering the front and back end areas of the inner member 10 fixed on the interior face of the outer member 20 and for preventing leakage through the front and back edges of the inner member 10. Discussing the illustrated embodiment in further detail, front cover sheet 50 extends from the interior face of the folded portion 20C in the waist end area onto the front end area of the inner member 10 over the entire width on the interior face of the front body section F, whereas the back cover sheet 60 extends from the interior face of the folded portion 20C in the waist end area onto the back end area of the inner member 10 over the entire width on the interior face of the back body section B. The folded portions 20C formed by folding the outer member 20 onto the interior face of the diaper may be extended onto the inner member 10 until they overlap, to thereby form the portions equivalent to the cover sheets 50, 60 in the illustrated embodiment.

Side Seal

FIGS. 7 to 13 show side seals 21 in an enlarged scale, wherein the dotted line extending in the front-back direction LD along the inner edges of second melt-bonded areas 72 or the inner edges of third melt-bonded areas 73 to be discussed later, is merely an auxiliary line. The side seals 21 in the illustrated embodiments are formed by melt-bonding the section of the outer member 20 located in the front body section F and the section of the outer member 20 located in the back body section F along the opposed lateral edge zones thereof, with the interior faces of the front and back body sections F, B being put together (as if your hands were clasped in prayer). Further, in the region of the outer member 20 closer in the width direction WD to the center than the side seals 21, as the front body section F and the back body section B are not joined together, leg openings LO are formed at one end in the direction orthogonal to the width direction WD (vertical direction), of the side seals 21, while waist opening WO is formed at the other end of the side seals 21. That is, the side seals 21 extend from the waist opening WO down to the leg openings LO. Each side seal 21 has a number of melt-bonded areas arranged at intervals in a specific pattern, wherein a first line 81 of first melt-bonded areas 71 and non-melt-bonded areas 74 alternately arranged in the front-back direction LD, with each first melt-bonded area 71 having a shape elongated in the front-back direction LD, is positioned on the innermost side in the width direction WD of the side seal 21, second melt-bonded areas 72, each having a shape elongated in the front-back direction LD, are positioned outward in the width direction WD of the non-melt-bonded areas 74, and the first melt-bonded areas 71 and the second melt-bonded areas 72 are disposed in a staggered arrangement. A second line 82 of the second melt-bonded areas 72 arranged in the front-back direction LD is positioned adjacent outward of the first line 81 in the width direction WD with a non-melt-bonded zone 75, which extends continuously in the front-back direction LD, intervening therebetween.

With such a side seal 21, by, for example, a caregiver grasping the outer member 20 in the front body section F in the vicinity of the side seal 21 and the outer member 20 in the back body section B in the vicinity of the side seal 21 with his right and left hands, respectively, and applying external force to the side seal 21 in the direction to pull the right and left hands away from each other, the outer member 20 in the front body section F or the outer member 20 in the back body section B may be, as shown in FIG. 15, torn off along the melt-bonded areas 71, 72 of the side seal 21 continuously from the waist opening WO down to the leg opening LO. More specifically, by the following tearing mechanism, tearing along the side seal 21 is facilitated while the transverse ripping is hard to occur.

That is, in tearing, it is assumed that the tearing occurs basically along the melt-bonded areas 71, 72, because the melt-bonded areas 71, 72, which have undergone melt-solidification, are hard to be deformed, and thus force tends to converge on the melt-bonded areas 71, 72, and the melt-bonded areas 71, 72 are weakened. However, if the melt-bonded areas 71, 72 have shapes elongated in the width direction WD, the direction of tearing is prone to be in the width direction WD. Further, if, for example, the melt-bonded areas 71, 72 and the non-melt-bonded areas 74 are simply arranged alternately and repeatedly in the front-back direction LD, upon transition of the tearing from one melt-bonded area 71, 72 to another melt-bonded area 71, 72, the direction of split of the non-melt-bonded area 74 is uncertain, which may lead to transverse ripping. In contrast, as in the illustrated embodiment, with the first melt-bonded areas 71 being spaced inwardly apart in the width direction WD from the second melt-bonded areas 72, when force for tearing along the side seal 21 is applied to the front body section F or the back body section B, such tearing force is predominantly exerted to a first melt-bonded area 71 due to material stretching or the like, and split of the first melt-bonded area 71 occurs and proceeds in the front body section F or in the back body section B. The tearing force is then exerted to a second melt-bonded area 72 following the first melt-bonded area 71 due to stretching of a non-melt-bonded area 74 or the like, and split of the second melt-bonded area 72 occurs and proceeds.

Thus, when a first melt-bonded area 71 is located at the edge of the waist opening WO, where the tearing is initiated, following microscopic split cycles as shown in FIG. 10 are initiated in sequence along the tearing direction of the side seal 21 to proceed with the tearing:

(a) split along one of the first melt-bonded areas 71 adjacent to each other in the front-back direction LD and split along the other occur almost simultaneously or one after another, (b) during the process of or after completion of step (a), split along the second melt-bonded area 72 located outward in the width direction WD of and between the two first melt-bonded areas 71 occurs, and (c) subsequently, splits of a pair of portions of the non-melt-bonded zone 75 each connecting the split along one of the first melt-bonded areas 71 and the split along the second melt-bonded area 72 occurs almost simultaneously or one after another.

Here, in steps (a) and (b), as the first melt-bonded areas 71 and the second melt-bonded area 72 have shapes elongated in the front-back direction LD, the direction of tearing is stable in the front-back direction LD, and the transverse ripping is hard to occur. Further, in step (c), since the splits along the first melt-bonded areas 71 and the split along the second melt-bonded area 72 have already occurred, the force is converged on the pair of portions connecting these splits to promote splitting directed from the splits along the first melt-bonded areas 71 to the split along the second melt-bonded area 72 (i.e., obliquely), so that the transverse ripping is hard to occur. Consequently, the overall side seal 21 is easy to tear along itself, and the transverse ripping is hard to occur.

Alternatively, as shown in FIG. 11, when a melt-bonded area located closest to where the tearing is initiated is a first melt-bonded area 71, and a non-melt-bonded portion, such as a non-melt-bonded area 74, is present between this first melt-bonded area 71 and the edge of the waist opening WO, where the tearing is initiated, the split cycles of steps (a) to (c) are initiated in sequence along the tearing direction of a side seal 21 to proceed with the tearing, while in the first split cycle, during the transition from step (a) to step (b), the tearing force is converged on a portion connecting the edge of the waist opening WO and the split along the initial first melt-bonded area 71, to proceed splitting.

On the other hand, when a second melt-bonded area 72 is located at the edge of the waist opening WO, where the tearing is initiated, as shown in FIG. 12,
(d) split along the initial second melt-bonded area 72 and split along the first melt-bonded area 71 closest thereto occur almost simultaneously or one after another, and
(e) after completion of the splits in step (d), split of a portion of the non-melt-bonded zone 75 connecting the split along the initial second melt-bonded area 72 and the split along the first melt-bonded area 71 closest thereto occurs,
whereas, while step (d) proceeds, starting from the first melt-bonded area 71 closest to the initial second melt-bonded area 72 and the first melt-bonded area 71 adjacent thereto, the split cycles of (a) to (c) are initiated in sequence along the tearing direction of the side seal 21 to proceed with the tearing.

Here, in step (d), as the first melt-bonded area 71 and the second melt-bonded area 72 have shapes elongated in the front-back direction LD, the direction of tearing is stable in the front-back direction LD, and the transverse ripping is hard to occur. Further, in step (e), since the split along the initial second melt-bonded area 72 and the split along the subsequent first melt-bonded area 71 have already occurred, the force is converged on the portion connecting these splits to promote splitting directed from the initial second melt-bonded area 72 to the split along the subsequent first melt-bonded area 71 (i.e., obliquely), so that the transverse ripping is hard to occur.

Alternatively, as shown in FIG. 13, when a melt-bonded area located closest to where the tearing is initiated is a second melt-bonded area 72, and non-melt-bonded portion is present between this initial second melt-bonded area 72 and the edge of the waist opening WO, where the tearing is initiated, the split cycles of steps (d) and (e) are initiated in sequence along the tearing direction of the side seal 21 to proceed with the tearing, while in the initial split cycle, during step (d), the tearing force is converged on a portion of the non-melt-bonded zone 75 connecting the edge of the waist opening WO and the split along the initial second melt-bonded area 72 to cause splitting.

In sum, irrespective of whether the initial melt-bonded area is a first melt-bonded area 71 or a second melt-bonded area 72, or the like factors, the overall side seal 21 is easy to tear along itself, and the transverse ripping is hard to occur. Through the experiments conducted by the present inventors, it has been confirmed that the tearing mechanism discussed above is predominant with partial exception. Note that the split along a melt-bonded area 71, 72 encompasses any split occurring inside or along the edge of a melt-bonded area 71, 72, including split extending along the inner edge in the width direction WD of a melt-bonded area 71, 72; split extending along the outer edge in the width direction WD of a melt-bonded area 71, 72; split extending inside a melt-bonded area 71, 72 from one of its ends in the front-back direction LD to the other; split constituted by a plurality of these splits in different locations connected to each other and extending as one split from one of the ends in the front-back direction LD of a melt-bonded area 71, 72 to the other (for example, split from one of the ends in the front-back direction LD of a melt-bonded area 71, 72, extending along the inner edge in the width direction WD part of the front-back direction LD, entering inside the melt-bonded area 71, 72, and extending up to the other end in the front-back direction LD of the melt-bonded area 71, 72); and a zig-zag or wavy split.

The side seals 21 in the illustrated embodiments are formed by stacking the material layers constituting the outer member 20 in the front body section F and the material layers constituting the outer member 20 in the back body section F, and joining the layers by means of melt-bonding. When the outer member 20 is formed of nonwoven fabric as discussed above, the nonwoven fabric at the melt-bonded areas 71, 72 has been molten into a film and become hard to stretch and weak, whereas the nonwoven fabric at the non-melt-bonded areas 74 and the non-melt bonded zone 75 maintains its stretchable nonwoven fabric structure. Consequently, the tearing force tends to be exerted on the melt-bonded areas 71, 72, which are prone to split along the peripheries thereof or along the thin, weak parts inside. In light of the above, the elongation in the width direction WD of the nonwoven fabric may preferably be 130 to 170%.

The width 21W of each side seal 21 may suitably be decided, and preferably 2 to 8 mm, more preferably 4 to 6 mm. With a width 21W of the side seal 21 less than 2 mm, precision is required in melt-bonding between the ventral outer member and the dorsal outer member, whereas with a width 21W over 8 mm, the side seal 21 is bulky.

The shape of each first melt-bonded area 71 may be any shape as long as it is elongated in the front-back direction LD. For example, the first melt-bonded area 71 may be in a longitudinally elongated rectangular shape (FIG. 7(*c*)); a semicircular shape having a contour composed of an arc, such as a circular arc extending so as to be positioned inward or outward in the width direction WD from its middle part toward each end thereof in the front-back direction LD, and a straight line extending in the front-back direction LD and connecting the ends of the arc ((FIG. 9(*c*)); a longitudinally elongated elliptical shape; a dogleg shape (FIG. 7(*d*)); an arcuate shape, such as a circular arc shape (FIGS. 7(*a*) and 7(*b*)); a wavy shape; or the like. The shape of the first melt-bonded area 71 may preferably be such that the force for tearing from this first melt-bonded area 71 to a second melt-bonded area 72 may hardly deflect inwards in the width direction WD. For example, with the first melt-bonded areas 71 in a dogleg shape as shown in FIG. 7(*d*), or with the first melt-bonded areas 71 in an arcuate shape as shown in FIGS. 7(*a*) and 7(*b*), since each first melt-bonded area 71 is located with its middle part in the front-back direction LD being on the innermost side in the width direction WD of a side seal 21, and extends so as to be positioned outward in the width direction WD toward each end in the front-back direction LD, the tearing force on the first melt-bonded area 71 is exerted predominantly to the middle part in the front-back direction LD, so that splitting is initiated from the middle part in the front-back direction LD of the first melt-bonded area 71, and changes its direction obliquely toward a second melt-bonded area 72. Accordingly, the direction of splitting during the transition of tearing from the first melt-bonded area 71 to the second melt-bonded area 72 tends to become stable, which causes the transverse ripping hard to occur. It is indisputable that each first melt-bonded area 71 may be located with its middle part in the front-back direction LD being on the outermost side in the width direction WD of a side seal 21, and extend so as to be positioned inward in the width direction WD toward each end in the front-back direction LD.

The size of each first melt-bonded area 71 may suitably be decided, and the dimension 71L in the front-back direction LD may preferably be 0.5 to 2.0 mm, particularly 0.8 to 1.5 mm, and the dimension 71W in the width direction WD may preferably be 0.1 to 0.8 times the dimension 71L in the front-back direction. Preferably, the dimension 71W in the width direction WD of each first melt-bonded area 71 may specifically be 0.1 to 0.5 mm, particularly 0.2 to 0.4 mm. The size of the first melt-bonded areas 71 may preferably be the same, but the size of some of the first melt-bonded areas 71 may be different from that of the remaining.

The dimension 74L in the front-back direction LD of each non-melt-bonded area 74 in the first line 81 may preferably be 1.0 to 2.5 mm, more preferably 1.3 to 2.0 mm. The size of the non-melt-bonded areas 74 may preferably be the same, but the size of some of the non-melt-bonded areas 74 may be different from that of the remaining.

The shape of each second melt-bonded area 72 may be any shape as long as it is elongated in the front-back direction LD, and may suitably be selected from the shapes similar to that of the first melt-bonded areas 71. In particular, when the second melt-bonded areas 72 have a dogleg shape, an arcuate shape, or the like shape, the direction of the bent may be the same as that of the first melt-bonded areas 71, or may be opposite (that is, when each first melt-bonded area 71 is located with its middle part in the front-back direction LD being on the innermost side in the width direction WD of a side seal 21, and extends so as to be positioned outward in the width direction WD toward each end in the front-back direction LD, each second melt-bonded area 72 extends so as to be positioned inward in the width direction WD from its middle part toward each end in the front-back direction LD). Similarly, when each second melt-bonded area is in a shape having a contour composed of an arc, such as a circular arc, and a straight line connecting the ends of the arc, for example, a semicircular shape, the contour of the arc may extend so as to be positioned inward or outward in the width direction WD w from its middle part toward each end in the front-back direction LD.

The size of each second melt-bonded area 72 may suitably be decided, and the upper limit of the dimension 72L in the front-back direction LD may preferably be smaller than the sum of the dimension 71L in the front-back direction LD of a first melt-bonded area 71 and the dimension 74L in the front-back direction LD of a non-melt-bonded area 74, for example, 0.6 times the sum, whereas the lower limit of the dimension 72L in the front-back direction LD may preferably be 0.4 times the dimension 74L in the front-back direction LD of a non-melt-bonded area 74L. In particular, the dimension 72L in the front-back direction LD of the second melt-bonded area 72 may preferably be smaller than the dimension 71L in the front-back direction LD of the first melt-bonded area 71, for example, 0.4 to 0.9 times the dimension 71L. The dimension 72W in the width direction WD of the second melt-bonded area 72 may preferably be 0.2 to 0.6 times the dimension 72L in the front-back direction LD. More specifically, the dimension 72L in the front-back direction LD of the second melt-bonded area 72 may be preferably 0.5 to 1.2 mm, particularly preferably 0.7 to 1.0 mm, whereas the dimension 72W in the width direction WD of the second melt-bonded area 72 may be preferably 0.1 to 0.5 mm, particularly preferably 0.2 to 0.4 mm.

The position in the front-back direction LD of each second melt-bonded area 72 is not particularly limited as long as the second melt-bonded area 72 has a part positioned outward in the width direction WD of a corresponding non-melt-bonded area 74 of the first line 81. The center in the front-back direction LD of the second melt-bonded area 72 may be displaced either forward or backward with respect to the line passing the center in the front-back direction LD of the corresponding non-melt-bonded area 74 of the first line 81 and extending in the width direction WD, but may preferably be positioned on this line for smooth tearing. Further, the dimension 72L in the front-back direction LD of the second melt-bonded area 72 may preferably be smaller than the dimension 74L in the front-back direction LD of the non-melt-bonded area 74 of the first line 81, for example, 0.3 to 0.8 times the dimension 74L, but may be the same as or larger than the dimension 74L in the front-back direction LD of the non-melt-bonded area 74 of the first line 81.

The intervals in the front-back direction LD between adjacent second melt-bonded areas 72 in the second line 82 may be decided depending on the dimension in the front-back direction LD of each second melt-bonded area 72 and arrangement in the front-back direction LD of the second melt-bonded areas 72, and may usually be 1.8 mm to 2.7 mm, particularly preferably 2.0 to 2.5 mm.

The minimum dimension 75W in the width direction WD of the non-melt-bonded zone 75 (the minimum distance between the first line 81 and the second line 82) may suitably be decided, and may preferably be smaller than the dimension 74L in the front-back direction LD of a non-melt-bonded area 74 in the first line 81 (the intervals in the front-back direction LD between adjacent first melt-bonded areas 71), for example, 0.2 to 0.8 times the dimension 74L. More specifically, the minimum dimension 75W in the width direction WD of the non-melt-bonded zone 75 may be preferably 0.3 to 1.5 mm, more preferably 0.5 to 1.0 mm.

With the first melt-bonded areas 71 in an arcuate shape, when each second melt-bonded area 72 has a part located on an extension of the tangent line at an end of the closest first melt-bonded area 71, tearing of the non-melt-bonded zone 75 between the first melt-bonded area 71 and the second melt-bonded area 72 may easily be guided from the first melt-bonded area 71 to the second melt-bonded area 72 to facilitate avoidance of unintentional transverse ripping inwardly in the width direction WD. Similarly, with the first melt-bonded areas 71 in a dogleg shape, when each second melt-bonded area 72 has a part located on an extension of an end of the closest first melt-bonded area 71, the tearing may easily be guided from the first melt-bonded area 71 to the second melt-bonded area 72.

With the first melt-bonded areas 71 in an arcuate shape, when the angle θ of any tangent line to the first melt-bonded area 71 with respect to the width direction WD is 30 to 90 degrees, more preferably 30 to 70 degrees, the tearing force may tend to be transmitted in the front-back direction LD, rather than the width direction WD, which facilitates tearing in the longitudinal direction while avoiding the transverse ripping. Similarly, with the first melt-bonded areas 71 in a dogleg shape, when the angle θ of the extension of an end of the first melt-bonded area 71 with respect to the width direction WD is 30 to 90 degrees, more preferably 30 to 70 degrees, the tearing force may tend to be transmitted in the front-back direction LD, rather than the width direction WD, which facilitates tearing in the longitudinal direction while avoiding transverse ripping.

As shown in FIG. 7(b), a side seal 21 may be composed only of the first melt-bonded areas 71 and the second melt-bonded areas 72 but, in that case, when any of the first melt-bonded areas 71 or any of the second melt-bonded areas 72 has a defect in melt-bonding (including not only the case where the melt-bonding has been made but imperfectly and is prone to be unbonded easily, but also the case where the melt-bonding has not been made), unintentional tearing may occur at such a melt-bonding defect upon fitting the diaper, or wearability or appearance of the diaper may be impaired. In view of this, as shown in FIG. 7 or the like, it is preferred that a third line 83 of third melt-bonded areas 73 arranged at intervals in the front-back direction LD and spaced apart from the second melt-bonded areas 72 is positioned adjacent outward in the width direction WD of the first line 81 with the non-melt-bonded zone 75 intervening therebetween. In this way, even when part of the first melt-bonded areas 71 in the first line 81 or part of the second melt-bonded areas 72 in the second line 82 are unbonded due to the melt-bonding defect, the continuity of the side seal 21 may be supplemented with the third melt-bonded areas 73. The melt-bonding defect is likely to occur when the melt-bonded area is smaller (the amount of the melt-bonding material is smaller) due to the elongate shape of the first melt-bonded areas 71 and the second melt-bonded areas 72 as discussed above, or the like factor. Thus, it is preferred that the area of each third melt-bonded area 73 is larger than the area of each first melt-bonded area 71 and than the area of each second melt-bonded area 72 and, for example, 2 to 5 times the larger of the area of the first melt-bonded area 71 and the area of the second melt-bonded area 72.

The shape of each third melt-bonded area 73 is not particularly limited, and may be polygonal, such as rectangular, circular, elliptical, arcuate, such as circular arcuate, wavy, or the like shape. The third melt-bonded area 73 may have a shape elongated in the width direction WD as in the illustrated embodiments, or a shape elongated in the front-back direction LD. Further, a plurality of third melt-bonded areas 73 may be arranged at intervals in the front-back direction LD, in the width direction WD, or in an oblique direction.

The layout of the third melt-bonded areas 73 may suitably be decided and, for supplementing the continuity of the side seals 21 with the third melt-bonded areas 73 even when any of the first melt-bonded areas 71 and the second melt-bonded areas 72 are unbonded due to melt-bonding defect, it is preferred that each third melt-bonded area 73 is located outward in the width direction WD of the first melt-bonded areas 71 and between and outward in the width direction WD of the adjacent second melt-bonded areas 72.

The size of each third melt-bonded area 73 may suitably be decided and, with the third melt-bonded areas 73 in a laterally elongated shape, the dimension 73L in the front-back direction LD may preferably be 0.2 to 0.6 mm, particularly preferably 0.3 to 0.5 mm, whereas the dimension 73W in the width direction WD may preferably be 1.5 to 5.0 mm, particularly preferably 2.5 to 3.5 mm. With the third melt-bonded areas 73 in a longitudinally elongated shape, the dimension 73L in the front-back direction LD may preferably be 0.5 to 1.5 mm, particularly preferably 0.7 to 1.3 mm, whereas the dimension 73W in the width direction WD may preferably be 0.4 to 1.0 mm, particularly preferably 0.4 to 0.6 mm. The size of the third melt-bonded areas 73 may preferably be the same, but the size of some of the third melt-bonded areas 73 may be different from that of the remaining.

Note that melt-bonded areas other than the first melt-bonded areas 71, the second melt-bonded areas 72, and the third melt-bonded areas 73 may be or may not be present but, for the purpose of reducing the risk of unwanted guiding of force during tearing, such other melt-bonded areas are preferably not present.

Here, the minimum distance d1 between a first melt-bonded area 71 and a second melt-bonded area 72 closest thereto is preferably shorter than the minimum distance d2 between a first melt-bonded area 71 and a third melt-bonded area 73 closest thereto and than the minimum distance d3 between a second melt-bonded area 72 and a third melt-bonded area 73 closest thereto, and may preferably be, for example, 0.2 to 0.9 times the shorter of d2 and d3. This layout facilitates continuous tearing of the first and second melt-bonded areas 71, 72, and makes tearing in other directions or transverse ripping hard to occur.

The relative positions of the second melt-bonded areas 72 and the third melt-bonded areas 73 may suitably be decided. As shown in FIG. 9(c), the outer edges in the width direction WD of the second melt-bonded areas 72 may be located inward in the width direction WD of the inner edges in the width direction WD of the third melt-bonded areas 73 or, as shown in FIG. 9(b), the inner edges in the width direction WD of the second melt-bonded areas 72 may be located outward in the width direction WD of the inner edges in the width direction WD of the third melt-bonded areas 73. Though not shown, the inner edges in the width direction WD of the second melt-bonded areas 72 may be located inward in the width direction WD of the inner edges in the width direction WD of the third melt-bonded areas 73, and the outer edges in the width direction WD of the second melt-bonded areas 72 may be located outward in the width direction WD of the inner edges in the width direction WD of the third melt-bonded areas 73.

As shown in FIGS. 7, 9(a), and 9(d), the inner edges in the width direction WD of the second melt-bonded areas 72 and the inner edges in the width direction WD of the third melt-bonded areas 73 may be aligned in the front-back direction LD or, as shown in FIG. 9(b), the inner edges in the width direction WD of the second melt-bonded areas 72 may be located outward in the width direction WD of the inner edges in the width direction WD of the third melt-bonded areas 73. In this case, as the second line 82 is present encompassed by the third line 83, the dimension in the width direction WD of the side seals 21 may be reduced, which may in turn reduce the stiffness of the side seals 21 and may be likely to mitigate discomfort in wearing the diaper.

On the other hand, as shown in FIG. 9(c), with the outer edges in the width direction WD of the second melt-bonded areas 72 being located inward in the width direction WD of the inner edges in the width direction WD of the third melt-bonded areas 73, the first line 81, the second line 82, and the third line 83 are positioned in this order from inner side toward outer side in the width direction WD without overlapping in the width direction WD, so that variation in area ratio of the melt-bonded areas (melt-bonded ratio) over each line is little and the melt-bonding is likely to be stable.

As the front body section F and the back body section B are respectively composed of a plurality of stacked sheets, each side seal 21 tends to have a plurality of regions containing different numbers of the stacked sheets, the regions being arranged in the front-back direction LD as shown in FIG. 14. In this case, the number of the stacked sheets in the lower side seal region 21L is generally smaller than the number of the stacked sheets in the upper side seal region 21U. Thus, as shown in FIG. 9(d), the dimensions in the width direction WD of the third melt-bonded areas 73 may be larger in the lower side seal region 21L, where the number of stacked sheets is smaller, than in the upper side seal region 21U, where the number of stacked sheets is larger. This is because in the region where the number of the stacked sheets is smaller, the amount of resin involved in the melt-bonding is smaller, which may result in lower strength of the melt-bonding. When the dimensions in the width direction WD of the third melt-bonded areas are the same between the upper side seal region 21U with a larger number of stacked sheets and the lower side seal region 21L with a smaller number of stacked sheets, melt-bonding defect, such as too strong or too weak melt-bonding, may occur. For the purpose of remedying such melt-bonding defect, the dimensions in the width direction WD of the third melt-bonded areas 73 may be adjusted as discussed above. The melt-bonding defect may alternatively be remedied by increasing the number of the third melt-bonded areas 73 present in the lower side seal region 21L compared to that in the upper side seal region 21U. Naturally, the strength of the melt-bonding may be controlled suitably by adjusting the number of stacked sheets and, for example, when the number of stacked sheets in the upper side seal region 21U is smaller than that in the lower side seal region 21L, the melt-bonding in the upper side seal region 21U may be enhanced by increasing the number of melt-bonded areas, increasing the dimension in the width direction WD of the melt-bonded areas, increasing the dimension in the front-back direction LD of the melt-bonded areas, or a combination thereof. Further, when there are three or more regions in the front-back direction LD containing different numbers of stacked sheets, for example, when the cover sheet 60 in the back body section B is longer than the cover sheet 50 in the front body section F, the melt-bonding force may be adjusted for respective regions. For example, the melt-bonding may be enhanced in the region where the cover sheet 50 is not present and cover sheet 60 is present than in the region where both the cover sheets 50 and 60 are present, by increasing the number of melt-bonded areas, increasing the dimension in the width direction WD of the melt-bonded areas, increasing the dimension in the front-back direction LD of the melt-bonded areas, or a combination thereof.

Explanation of Terms in the Specification

The following terms appearing in the present specification shall have the following means unless otherwise specified herein.

The "front-back direction" refers to the direction shown by the reference sign LD (longitudinal direction) in the figures, whereas the "width direction" refers to the direction shown by the reference sign WD (transverse direction) in the figures, and the front-back direction and the width direction are orthogonal to each other.

The "vertical direction" refers to the direction, in an underpants type disposable diaper having a waist opening and a pair of right and left leg openings formed by the formation of the side seals, shown by the reference sign VE (top-bottom direction) in FIGS. 6, 14, and 15, specifically the direction of the straight line connecting the center of the waist opening and the center of the inner member.

The "spread state" refers to the state in which an article is spread flatly without contraction (including any contraction, such as contraction by means of elastic members) or slack.

The "stretch rate" refers to a value with respect to the natural length being 100%. For example, a 200% stretch rate is synonymous with stretch in two folds.

The "basis weight" is determined as follows. A specimen or test piece is preliminarily dried, left in a laboratory or in apparatus under the standard conditions (23±1° C. temperature and 50±2% relative humidity in the testing location) until constant mass is attained. The preliminary drying refers to attaining constant mass from a specimen or test piece in the environment at a temperature of 100° C. No preliminary drying may be performed on fibers with an official regain of 0.0%. From the test piece of the constant mass, a specimen of 100 mm×100 mm size is cut out using a sampling template (100 mm×100 mm). The weight of the specimen is measured and multiplied by 100 times to calculate the weight per 1 $m^2$, which is taken as the basis weight.

The water absorption is determined in accordance with JIS K7223-1996 "Testing method for water absorption capacity of super absorbent polymers".

The water absorption rate is defined as the "time spent until the end point is reached" in carrying out JIS K7224-1996 "Testing method for water absorption rate of super absorbent polymers" using 2 g of superabsorbent polymer and 50 g of saline.

The "elongation of nonwoven fabric" is determined by conducting a test of "Tensile Strength and Elongation" using a tensile tester with constant rate of extension of accuracy provided in JIS B 7721 based on ISO 9073-3, by applying a constant load at a constant rate to the specimen.

A test or measurement shall be, in the absence of description about environmental conditions, performed in a laboratory or in apparatus under the standard conditions (23±1° C. temperature and 50±2% relative humidity in the testing location).

The size of each part refers to the size not in the natural length state but in the spread state, unless otherwise specified.

INDUSTRIAL APPLICABILITY

The present invention is applicable generally to absorbent articles, including the underpants-type disposable diapers discussed above.

DESCRIPTION OF REFERENCE SIGNS

10: inner member
11: top sheet
12: liquid-impervious sheet
13: narrowed portion
14: packing sheet
15: gathered sheet 16: gathering elastic member
18: absorber body
20: outer member
20C: folded portion
21: side seal
24: waist elastic member
25: under-waist elastic member
26, 28: curved elastic member
26: dorsal curved elastic member
28: ventral curved elastic member
29: round-leg line
B: back body section
BS: three-dimensional gather part
F: front body section
71: first melt-bonded area
72: second melt-bonded area
73: third melt-bonded area
74: non-melt-bonded area
75: non-melt-bonded zone
81: first line
82: second line
83: third line

The invention claimed is:

1. A disposable wearing article comprising:
a front body section;
a back body section,
a waist opening;
a pair of leg openings; and
a pair of side seals formed by putting an interior face of the front body section and an interior face of the back body section together and melt-bonding the front and back body sections along opposed lateral edge zones thereof, each of the side seals having melt-bonded areas arranged at intervals in a specific pattern,
wherein each of the side seals comprises a first line of first melt-bonded areas and non-melt-bonded areas alternately arranged in a front-back direction, each of the first melt-bonded areas having a shape elongated in a front-back direction, the first line being positioned on an innermost side in a width direction of the side seal, and a second line of second melt-bonded areas arranged at intervals in the front-back direction, each of the second melt-bonded areas having a shape elongated in the front-back direction, the second line being positioned adjacent outward in the width direction of the first line with a non-melt-bonded zone intervening therebetween, the non-melt-bonded zone extending continuously in the front-back direction,
wherein the first melt-bonded areas and the second melt-bonded areas are disposed in a staggered arrangement so that the second melt-bonded areas are positioned outward in the width direction of the non-melt-bonded areas, and
wherein each of the first melt-bonded areas is shaped such that the first melt-bonded area has a middle part in the front-back direction located on an innermost side in the width direction of a side seal, and extends so as to be positioned outward in the width direction toward each end in the front-back direction.

2. The disposable wearing article according to claim 1, wherein each of the first melt-bonded areas is in an arcuate shape, and
wherein a second melt-bonded area is located in a direction of a tangent line at each end of the first melt-bonded area.

3. The disposable wearing article according to claim 2, wherein any tangent line to the first melt-bonded area forms an angle of 30 to 90 degrees with respect to the width direction.

4. The disposable wearing article according to claim 2, wherein a dimension in the front-back direction of each first melt-bonded area is 0.5 to 2.0 mm,
wherein a dimension in the width direction of the first melt-bonded area is 0.1 to 0.8 times the dimension in the front-back direction of the first melt-bonded area,
wherein a minimum dimension in the front-back direction of each non-melt-bonded area is 1.0 to 2.5 mm,
wherein a dimension in the front-back direction of each second melt-bonded area is 0.2 to 1.0 time the minimum dimension in the front-back direction of the non-melt-bonded area,
wherein a dimension in the width direction of the second melt-bonded area is 0.2 to 0.6 times the dimension in the front-back direction of the second-melt-bonded area,
wherein a center in the front-back direction of the second melt-bonded area is positioned on a line passing a center in the front-back direction of the non-melt-bonded area and extending in the width direction, and
wherein a minimum dimension in the width direction of the non-melt-bonded zone is 0.1 to 0.6 times the minimum dimension in the front-back direction of the non-melt-bonded area.

5. The disposable wearing article according to claim 2,
wherein a third line of third melt-bonded areas arranged at intervals in the front-back direction is positioned adjacent outward in the width direction of the first line with the non-melt-bonded zone intervening therebetween,
wherein the second melt-bonded areas and the third melt-bonded areas are spaced apart from each other,
wherein an area of each third melt-bonded area is larger than an area of each first melt-bonded area and then an area of each second melt-bonded area, and
wherein a minimum distance between a first melt-bonded area and a second melt-bonded area closest thereto is shorter than a minimum distance between the first melt-bonded area and a third melt-bonded area closest thereto and then a minimum distance between the second melt-bonded area and a third melt-bonded area closest thereto.

6. The disposable wearing article according to claim 1,
wherein each of the first melt-bonded areas is in an arcuate shape, and
wherein any tangent line to the first melt-bonded area forms an angle of 30 to 90 degrees with respect to the width direction.

7. The disposable wearing article according to claim 1,
wherein a dimension in the front-back direction of each first melt-bonded area is 0.5 to 2.0 mm,
wherein a dimension in the width direction of the first melt-bonded area is 0.1 to 0.8 times the dimension in the front-back direction of the first melt-bonded area,
wherein a minimum dimension in the front-back direction of each non-melt-bonded area is 1.0 to 2.5 mm,
wherein a dimension in the front-back direction of each second melt-bonded area is 0.2 to 1.0 time the minimum dimension in the front-back direction of the non-melt-bonded area,
wherein a dimension in the width direction of the second melt-bonded area is 0.2 to 0.6 times the dimension in the front-back direction of the second-melt-bonded area, wherein a center in the front-back direction of the second melt-bonded area is positioned on a line passing a center in the front-back direction of the non-melt-bonded area and extending in the width direction, and wherein a minimum dimension in the width direction of the non-melt-bonded zone is 0.1 to 0.6 times the minimum dimension in the front-back direction of the non-melt-bonded area.

8. The disposable wearing article according to claim 1, wherein a third line of third melt-bonded areas arranged at intervals in the front-back direction is positioned adjacent outward in the width direction of the first line with the non-melt-bonded zone intervening therebetween, wherein the second melt-bonded areas and the third melt-bonded areas are spaced apart from each other, wherein an area of each third melt-bonded area is larger than an area of each first melt-bonded area and then an area of each second melt-bonded area, and wherein a minimum distance between a first melt-bonded area and a second melt-bonded area closest thereto is shorter than a minimum distance between the first melt-bonded area and a third melt-bonded area closest thereto and then a minimum distance between the second melt-bonded area and a third melt-bonded area closest thereto.

9. A disposable wearing article comprising:

a front body section;

a back body section, a waist opening;

a pair of leg openings; and a pair of side seals formed by putting an interior face of the front body section and an interior face of the back body section together and melt-bonding the front and back body sections along opposed lateral edge zones thereof, each of the side seals having melt-bonded areas arranged at intervals in a specific pattern, wherein each of the side seals comprises a first line of first melt-bonded areas and non-melt-bonded areas alternately arranged in a front-back direction, each of the first melt-bonded areas having a shape elongated in a front-back direction, the first line being positioned on an innermost side in a width direction of the side seal, and a second line of second melt-bonded areas arranged at intervals in the front-back direction, each of the second melt-bonded areas having a shape elongated in the front-back direction, the second line being positioned adjacent outward in the width direction of the first line with a non-melt-bonded zone intervening therebetween, the non-melt-bonded zone extending continuously in the front-back direction, wherein the first melt-bonded areas and the second melt-bonded areas are disposed in a staggered arrangement so that the second melt-bonded areas are positioned outward in the width direction of the non-melt-bonded areas, wherein a dimension in the front-back direction of each first melt-bonded area is 0.5 to 2.0 mm, wherein a dimension in the width direction of the first melt-bonded area is 0.1 to 0.8 times the dimension in the front-back direction of the first melt-bonded area, wherein a minimum dimension in the front-back direction of each non-melt-bonded area is 1.0 to 2.5 mm, wherein a dimension in the front-back direction of each second melt-bonded area is 0.2 to 1.0 time the minimum dimension in the front-back direction of the non-melt-bonded area, wherein a dimension in the width direction of the second melt-bonded area is 0.2 to 0.6 times the dimension in the front-back direction of the second-melt-bonded area, wherein a center in the front-back direction of the second melt-bonded area is positioned on a line passing a center in the front-back direction of the non-melt-bonded area and extending in the width direction, and wherein a minimum dimension in the width direction of the non-melt-bonded zone is 0.1 to 0.6 times the minimum dimension in the front-back direction of the non-melt-bonded area.

10. The disposable wearing article according to claim 9, wherein a third line of third melt-bonded areas arranged at intervals in the front-back direction is positioned adjacent outward in the width direction of the first line with the non-melt-bonded zone intervening therebetween, wherein the second melt-bonded areas and the third melt-bonded areas are spaced apart from each other, wherein an area of each third melt-bonded area is larger than an area of each first melt-bonded area and then an area of each second melt-bonded area, and wherein a minimum distance between a first melt-bonded area and a second melt-bonded area closest thereto is shorter than a minimum distance between the first melt-bonded area and a third melt-bonded area closest thereto and then a minimum distance between the second melt-bonded area and a third melt-bonded area closest thereto.

11. A disposable wearing article comprising:

a front body section;

a back body section, a waist opening;

a pair of leg openings; and a pair of side seals formed by putting an interior face of the front body section and an interior face of the back body section together and melt-bonding the front and back body sections along opposed lateral edge zones thereof, each of the side seals having melt-bonded areas arranged at intervals in a specific pattern, wherein each of the side seals comprises a first line of first melt-bonded areas and non-melt-bonded areas alternately arranged in a front-back direction, each of the first melt-bonded areas having a shape elongated in a front-back direction, the first line being positioned on an innermost side in a width direction of the side seal, and a second line of second melt-bonded areas arranged at intervals in the front-back direction, each of the second melt-bonded areas having a shape elongated in the front-back direction, the second line being positioned adjacent outward in the width direction of the first line with a non-melt-bonded zone intervening therebetween, the non-melt-bonded zone extending continuously in the front-back direction, wherein the first melt-bonded areas and the second melt-bonded areas are disposed in a staggered arrangement so that the second melt-bonded areas are positioned outward in the width direction of the non-melt-bonded areas, wherein a third line of third melt-bonded areas arranged at intervals in the front-back direction is positioned adjacent outward in the width direction of the first line with the non-melt-bonded zone intervening therebetween, wherein the second melt-bonded areas and the third melt-bonded areas are spaced apart from each other, wherein an area of each third melt-bonded area is larger than an area of each first melt-bonded area and then an area of each second melt-bonded area, and wherein a minimum distance between a first melt-bonded area and a second melt-bonded area closest thereto is shorter than a minimum distance between the first melt-bonded area and a third melt-bonded area closest thereto and then a minimum distance between the second melt-bonded area and a third melt-bonded area closest thereto.

12. The disposable wearing article according to claim 11, wherein inner edges in the width direction of the second melt-bonded areas and inner edges in the width direction of the third melt-bonded areas are aligned on a straight line in the front-back direction, or wherein the inner edges in the width direction of the second melt-bonded areas are located outward in the width direction of the inner edges in the width direction of the third melt-bonded areas.

13. The disposable wearing article according to claim 12, wherein outer edges in the width direction of the second melt-bonded areas are located inward in the width direction of the inner edges in the width direction of the third melt-bonded areas.

14. The disposable wearing article according to claim 12, wherein the opposed lateral edge zones of the front body section and the opposed lateral edge zones of the back body section respectively have a plurality of stacked sheets, wherein each side seal has a plurality of regions containing different numbers of the stacked sheets, the regions being arranged in the front-back direction, and wherein dimensions in the width direction of the third melt-bonded areas are larger in a region where the number of the stacked sheets is smaller than in a region where the number of the stacked sheets is larger.

15. The disposable wearing article according to claim 11, wherein outer edges in the width direction of the second melt-bonded areas are located inward in the width direction of the inner edges in the width direction of the third melt-bonded areas.

16. The disposable wearing article according to claim 11, wherein the opposed lateral edge zones of the front body section and the opposed lateral edge zones of the back body section respectively have a plurality of stacked sheets, wherein each side seal has a plurality of regions containing different numbers of the stacked sheets, the regions being arranged in the front-back direction, and wherein dimensions in the width direction of the third melt-bonded areas are larger in a region where the number of the stacked sheets is smaller than in a region where the number of the stacked sheets is larger.

* * * * *